US011891920B2

(12) United States Patent
Koyabu et al.

(10) Patent No.: US 11,891,920 B2
(45) Date of Patent: Feb. 6, 2024

(54) TURBINE STATOR VANE AND GAS TURBINE

(71) Applicant: Mitsubishi Power, Ltd., Kanagawa (JP)

(72) Inventors: Hidemichi Koyabu, Yokohama (JP); Satoshi Hada, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 213 days.

(21) Appl. No.: 17/441,882

(22) PCT Filed: Mar. 30, 2020

(86) PCT No.: PCT/JP2020/014562
§ 371 (c)(1),
(2) Date: Sep. 22, 2021

(87) PCT Pub. No.: WO2020/213381
PCT Pub. Date: Oct. 22, 2020

(65) Prior Publication Data
US 2022/0186623 A1 Jun. 16, 2022

(30) Foreign Application Priority Data
Apr. 16, 2019 (JP) ................................ 2019-077457

(51) Int. Cl.
*F01D 9/02* (2006.01)

(52) U.S. Cl.
CPC ............ *F01D 9/02* (2013.01); *F05D 2220/32* (2013.01); *F05D 2240/12* (2013.01); *F05D 2260/201* (2013.01)

(58) Field of Classification Search
CPC ... F01D 9/02; F01D 9/023; F01D 9/04; F01D 5/14; F01D 25/08; F05D 2240/11;
(Continued)

(56) References Cited

U.S. PATENT DOCUMENTS 7,967,567 B2 * 6/2011 Liang ...................... F01D 9/065 415/115
8,827,632 B1 * 9/2014 Lee ........................ F01D 5/188 415/115

(Continued)

FOREIGN PATENT DOCUMENTS

| | | |
|---|---|---|
| JP | 2000-230404 | 8/2000 |
| JP | 2013-522532 | 6/2013 |
| WO | 2011/115731 | 9/2011 |

OTHER PUBLICATIONS

International Search Report dated Jun. 16, 2020 in corresponding International Application No. PCT/JP2020/014562, with English language translation.

(Continued)

*Primary Examiner* — Courtney D Heinle
*Assistant Examiner* — Danielle M. Christensen
(74) *Attorney, Agent, or Firm* — Wenderoth, Lind & Ponack, L.L.P.

(57) ABSTRACT

A turbine stator vane includes: a vane body which includes: an airfoil portion which has a serpentine flow passage inside thereof, the serpentine flow passage including a plurality of cooling flow passages and a plurality of turn-back flow passages; a shroud disposed on at least one of a tip end side or a root end side, in the vane height direction, of the airfoil portion; and a lid portion fixed to the airfoil portion. The lid portion forming the turn-back flow passage and being provided as a separate member from the airfoil portion. The lid portion has an inner wall surface width formed to be greater than the flow-passage width of the cooling passage formed in the airfoil portion, and a minimum value of a thickness of the lid portion is smaller than a thickness of a part of the shroud to which the lid portion is mounted.

15 Claims, 19 Drawing Sheets

(58) Field of Classification Search
CPC ........... F05D 2240/12; F05D 2240/128; F05D 2240/81; F05D 2250/185; F05D 2260/201
See application file for complete search history.

(56) References Cited

U.S. PATENT DOCUMENTS

| | | | | |
|---|---|---|---|---|
| 8,864,438 | B1 | 10/2014 | Lee et al. | |
| 2012/0020768 | A1* | 1/2012 | Krueckels | F01D 25/12<br>415/177 |
| 2018/0195397 | A1 | 7/2018 | Spangler | |
| 2018/0320531 | A1* | 11/2018 | Spangler | F01D 5/147 |
| 2020/0024991 | A1* | 1/2020 | Kim | F01D 5/142 |

OTHER PUBLICATIONS

International Preliminary Report on Patentability dated Oct. 28, 2021 in corresponding International Application No. PCT/JP2020/014562, with English language translation.
Office Action dated May 31, 2022 in corresponding Japanese Patent Application No. 2021-514856, with Machine Translation.

* cited by examiner

C－C

F — F

H－H

TURBINE STATOR VANE AND GAS TURBINE

TECHNICAL FIELD

The present disclosure relates to a turbine stator vane and a gas turbine.

BACKGROUND ART

A turbine vane is to be exposed to a high-temperature fluid such as combustion gas, and thus has a structure for cooling. As a cooling structure of a turbine vane, for instance, known is a structure for cooling an airfoil portion by flowing a cooling medium through a serpentine flow passage formed inside the airfoil portion.

The serpentine flow passage includes a plurality of cooling flow passages which extend inside the airfoil portion in the vane height direction, and which are separated by partition walls. For instance, a cooling medium flowing through a cooling flow passage from the first side toward the second side in the vane height direction passes a section which turns back at the second side of the cooling flow passage, flows into the cooling flow passage adjacent to the cooling flow passage, and flows from the second side toward the first side. At the above turn-back section, the flow velocity of the cooling medium may decrease, and the heat transfer coefficient may deteriorate.

Thus, for instance, in the gas turbine stator vane described in Patent Document 1, a serpentine flow passage is formed, where the flow passage at the turn-back section at the first side in the vane height direction is a flow passage that is closer to the first side than the gas path surface of the shroud at the first side, and the flow passage at the turn-back section at the second side in the vane height direction is closer to the second side than the gas path surface of the shroud at the second side (see Patent Document 1).

Furthermore, when a stator vane having a serpentine flow passage is to be produced by casting, due to the difficulty of casting, the core for forming the serpentine flow passage in casting may be divided into a plurality of segments, and a part of the turn-back flow passage may be disposed at the shroud side at the outer side of the gas path surface. In this case, the turn-back flow passage is formed by attaching a lid portion separate from the airfoil portion to the airfoil portion, and thereby the serpentine flow passage is formed as a whole.

CITATION LIST

Patent Literature

Patent Document 1: JP2000-230404A

SUMMARY

Problems to be Solved

In the gas turbine stator vane described in Patent Document 1, the cooling air flows linearly at the root portion of the vane connecting to the outer shroud and the inner shroud to cool the root portion, and then flows into the next passage while cooling the root portion again, whereby the cooling effect is enhanced.

However, in the gas turbine stator vane described in Patent Document 1, the flow passage of the turn-back section is positioned remote from the region where the combustion gas flows, and thereby the temperature at the portion forming the flow passage decreases, and the temperature difference from the portion positioned inside the region where the combustion gas flows at the airfoil portion increases. Thus, the thermal stress at the portion forming the flow passage at the turn-back section may become high.

In view of the above, an object of at least one embodiment of the present invention is to achieve both of suppression of deterioration of the cooling efficiency and suppression of thermal stress at a turbine stator vane.

Solution to the Problems (1) According to at least one embodiment of the present invention, a turbine stator vane includes: a vane body which includes: an airfoil portion which has a serpentine flow passage inside thereof, the serpentine flow passage including a plurality of cooling flow passages and a plurality of turn-back flow passages, at least one of the turn-back flow passages being disposed at an outer side or an inner side, in a vane height direction, of a gas path surface; and a shroud disposed on at least one of a tip end side or a root end side, in the vane height direction, of the airfoil portion; and a lid portion fixed to an end portion at the tip end side or the root end side, in the vane height direction, of the airfoil portion, the lid portion forming the at least one turn-back flow passage and being provided as a separate member from the airfoil portion. The lid portion has an inner wall surface width which forms a flow-passage width of the turn-back flow passage, the inner wall surface width being formed to be greater than the flow-passage width of the cooling passage formed in the airfoil portion, and a minimum value of a thickness of the lid portion is smaller than a thickness of a part of the shroud to which the lid portion is mounted.

With the above configuration (1), a lid portion is fixed to the vane body at the outer side or the inner side, in the vane height direction, of the gas path surface, the lid portion forming the turn-back flow passage and being provided as a separate member from the airfoil portion, and the lid portion has an inner wall surface width which forms a flow-passage width of the turn-back flow passage, the inner wall surface width being formed to be greater than the flow-passage width of the cooling passage formed in the airfoil portion, whereby it is possible to suppress increase of pressure loss of the cooling medium at the turn-back flow passage.

Furthermore, with the above configuration (1), the minimum value of the thickness of the lid portion is smaller than the thickness of the part of the shroud to which the lid portion is mounted, and thus it is possible to suppress thermal stress that acts on the lid portion.

(2) In some embodiments, in the above configuration (1), the airfoil portion includes a pressure-side vane surface recessed to have a concave shape in a circumferential direction, and a suction-side vane surface protruding to have a convex shape in the circumferential direction and connecting to the pressure-side vane surface via a leading edge and a trailing edge. The shroud includes: a bottom portion forming, in the vane height direction, an inner surface opposite to the gas path surface in the vane height direction; an outer wall portion formed on opposite ends, in an axial direction and the circumferential direction, of the bottom portion, the outer wall portion extending in the vane height direction; an impingement plate disposed in an internal space surrounded by the outer wall portion and the bottom portion, the impingement plate including a plurality of through holes; and a vane-surface protruding portion formed on the gas path surface, extending from a leading edge portion of the pressure-side vane surface toward the suction-side vane surface of the airfoil portion which is positioned adjacent in the circumferential direction, to an intermediate position of a flow passage width of the combustion gas flow passage between the airfoil portion and the adjacent airfoil portion, the vane-surface protruding portion being surrounded by an outer edge portion formed at a position connecting to the gas path surface and protruding from the gas path surface in the vane height direction.

With the above configuration (2), the shroud includes an outer wall portion formed on opposite ends, in the axial direction and the circumferential direction of the shroud, and an impingement plate having a plurality of through holes is disposed between the outer wall portion and the lid portion so as to cover the inner surface of the shroud, whereby it is possible to suppress thermal stress that occurs on the shroud.

Furthermore, a vane-surface protruding portion is formed on the gas path surface from the leading edge portion of the pressure-side vane surface toward the suction-side vane surface of the airfoil portion which is positioned adjacent in the circumferential direction, to an intermediate position of the flow passage width of the combustion gas flow passage, the vane-surface protruding portion being surrounded by an outer edge portion and protruding in the vane height direction, whereby it is possible to suppress generation of a secondary flow of the combustion gas flow on the gas path surface and improve the aerodynamic force of the vane.

(3) In some embodiments, in the above configuration (2), the impingement plate includes: a general region positioned so as to face the inner surface of the shroud being a region where the vane-surface protruding portion is not formed, the general region having the plurality of through holes configured to perform impingement cooling on the inner surface; and a high-density region including a range in which the vane-surface protruding portion is formed and which is surrounded by the outer edge portion, the high-density region having a higher opening density of the through holes than that in the general region.

With the above configuration (3), the impingement plate has a high-density region of the through holes where the vane-surface protruding portion is formed and a general region of the through holes where the vane-surface protruding portion is not formed, and the high-density region of the trough holes is formed in a range where the vane-surface protruding portion is formed and surrounded by the outer edge portion, whereby it is possible to suppress thermal stress that occurs in an area around the outer edge portion where the vane-surface protruding portion is formed.

(4) In some embodiments, in the above configuration (3), the impingement plate includes: a second impingement plate close to the inner surface in the vane height direction; and a first impingement plate positioned in a direction separating from the inner surface, in the vane height direction, with respect to the second impingement plate. The second impingement plate and the first impingement plate are connected via a step portion bended in the vane height direction. At least one of the step portion extending in the axial direction or the circumferential direction is disposed between the outer wall portion and the lid portion. The first impingement plate includes a first high-density region where the opening density is higher than that in a general region of the first impingement plate. The second impingement plate includes a second high-density region where the opening density is higher than that in a general region of the second impingement plate.

With the above configuration (4), the impingement plate includes the first impingement plate and the second impingement plate formed integrally via the step portion, and thus it is possible to suppress thermal stress that occurs on the impingement plate. Furthermore, the range of the outer edge portion where the vane-surface protruding portion is formed is cooled through impingement cooling from both of the first high-density region of the first impingement plate having a high opening density and the second high-density region of the second impingement plate, and thus it is possible to suppress thermal stress of an area around the outer edge portion of the vane-surface protruding portion even further.

(5) In some embodiments, in the above configuration (4), the shroud has a plurality of airfoil portions arranged in the circumferential direction, and the step portion is disposed between a plurality of the lid portions each of which is disposed on corresponding one of the airfoil portions, the step portion extending in the axial direction.

With the above configuration (5), the step portion is formed on the impingement plate between the lid portions fixed to the plurality of airfoil portions arranged in the circumferential direction on the shroud, and thus it is possible to suppress thermal stress that occurs on the impingement plate disposed between the airfoil portions.

(6) In some embodiments, in the above configuration (4) or (5), the step portion has an oblique surface which is oblique with respect to the vane height direction.

With the above configuration (6), the step portion formed on the impingement plate has an oblique surface which is oblique with respect to the vane height direction, and thus it is possible to process the step portion easily.

(7) In some embodiments, in any one of the above configurations (4) to (6), a hole diameter of first through holes being the through holes formed on the first impingement plate is greater than a hole diameter of second through holes being the through holes formed on the second impingement plate.

With the above configuration (7), the hole diameter of the through holes formed on the first impingement plate is formed to be greater than the hole diameter of the through holes formed on the second impingement plate, and thus it is possible to cool the shroud inner surface more effectively with the cooling medium.

(8) In some embodiments, in the above configuration (7), an arrangement pitch of the first through holes formed on the first impingement plate is greater than an arrangement pitch of the second through holes formed on the second impingement plate.

With the above configuration (8), the arrangement pitch of the through holes formed on the first impingement plate is formed to be greater than the arrangement pitch of the through holes formed on the second impingement plate, and thus it is possible to cool the shroud inner surface more effectively with the cooling medium, and suppress excessive consumption of the cooling medium.

(9) In some embodiments, in any one of the above configurations (4) to (8), the second impingement plate comprises two second impingement plates fixed to an inner surface of the outer wall portion of the shroud and to an outer wall surface of the lid portion respectively, and the first impingement plate is positioned between the two second impingement plates via the step portion.

With the above configuration (9), the first impingement plate and the second impingement plate are formed on the impingement plate integrated via the step portion, and thus it is possible to suppress thermal stress that occurs on the impingement plate.

(10) In some embodiments, in any one of the above configurations (3) to (9), the impingement plate has an opening to be engaged with the lid portion, and the lid portion includes a protruding portion protruding opposite to the airfoil portion from the opening in the vane height direction.

With the above configuration (10), it is possible to increase the size of the lid portion in the vane height direction, and thus it is possible to farther position the region where a change in the flow direction of the cooling medium at the turn-back flow passage causes a decrease in the flow velocity and deterioration of the heat transfer coefficient farther away from the region where the combustion gas flows. Accordingly, it is possible to suppress deterioration of the cooling efficiency in the vicinity of the shroud, of the airfoil portion.

(11) In some embodiments, in any one of the above configurations (1) to (10), the lid portion is fixed to the shroud via a welding portion.

With the above configuration (11), it is possible to fix the lid portion being a separate member from the airfoil portion to the airfoil portion via the shroud. The lid portion is fixed to the shroud via the welding portion, and the lid portion can be produced separately from the airfoil portion and the shroud, which makes it easier to produce the lid portion to have a relatively small thickness.

(12) In some embodiments, in any one of the above configurations (1) to (11), the shroud includes an outer shroud or an inner shroud formed on the root end side or the root end side of the airfoil portion.

(13) In some embodiments, in any one of the above configurations (1) to (12), the lid portion has a portion extending in the vane height direction, and a minimum thickness value of the portion is smaller than a thickness of a portion of the shroud to which the lid portion is mounted.

The lid portion forms the turn-back flow passage, and thus has a portion extending in the vane height direction (hereinafter, also referred to as a first portion) and a portion including a portion corresponding to an end portion, in the vane height direction, of the turn-back flow passage and extending in a direction different from that of the first portion (also referred to as a second portion), for instance. The first portion has an end portion at the shroud side which is to be mounted to the shroud, and thus positioned closer to the shroud than the second portion.

Herein, according to the above configuration (13), the minimum value of the thickness of the portion of the lid portion extending in the vane height direction is smaller than the thickness of the portion of the shroud to which the lid portion is mounted, and thus it is possible to make the thickness of the portion closer to the shroud smaller than the thickness of the portion of the shroud to which the lid portion is mounted. Accordingly, it is possible to suppress thermal stress that acts on the lid portion effectively.

(14) In some embodiments, in any one of the above configurations (1) to (13), the lid portion has a portion extending in the vane height direction, and a minimum thickness value of the portion is smaller than a thickness of a partition wall which partitions the plurality of cooling flow passages.

For instance, in a case where the airfoil portion has three or more cooling flow passages, there is a partition wall which partitions a pair of cooling flow passages being in communication through a turn-back flow passage formed by the lid portion from a flow passage other than the pair of cooling flow passages. Furthermore, a part of the portion of the lid portion extending in the vane height direction is connected to an end portion, of two end portions of the partition wall in the vane height direction, where the lid portion exists.

With the above configuration (14), the minimum value of the thickness of the portion of the lid portion extending in the vane height direction is smaller than the thickness of the partition wall, and thus, even when the partition wall is connected to the portion of the lid portion extending in the vane height direction as described above, it is possible to effectively suppress thermal stress which acts on the lid portion.

(15) In some embodiments, in the above configuration (10), the lid portion includes a plate support portion extending along a peripheral edge portion of the opening of the impingement plate so as to support the peripheral edge portion, and the impingement plate is fixed to the plate support portion of the lid portion via a welding portion.

With the above configuration (15), by supporting the plate support portion on the lid portion, it is easier to determine the position of the impingement plate with respect to the lid portion, which makes it easier to mount the impingement plate.

(16) In some embodiments, in any one of the above configurations (1) to (15), the lid portion is fixed to a partition wall partitioning the plurality of cooling flow passages via a part of a welding portion.

As described above, for instance, in a case where the airfoil portion has three or more cooling flow passages, there is a partition wall which partitions a pair of cooling flow passages being in communication through a turn-back flow passage formed by the lid portion from a flow passage other than the pair of cooling flow passages. Furthermore, a part of the portion of the lid portion extending in the vane height direction is connected to an end portion, of two end portions of the partition wall in the vane height direction, where the lid portion exists.

Accordingly, with the above configuration (16), it is possible to fix the lid portion produced to have a relatively small thickness compared to the airfoil portion and the shroud to the partition wall via a part of the welding portion.

(17) In some embodiments, in any one of the above configurations (1) to (16), the lid portion comprises a material having a lower heat-resistant temperature than a material of the vane body.

As described above, the lid portion is formed at the opposite side to the airfoil portion across the gas path surface in the vane height direction, and it is possible to position the lid portion farther from the region where the combustion gas flows. Thus, the heat-resistant temperature required for the lid portion is lower than the heat-resistant temperature required for the airfoil portion. Thus, with the lid portion including a material having a lower heat-resistant temperature than the material of the vane body as in the above configuration (15), it is possible to suppress the costs of the lid portion.

(18) According to at least one embodiment of the present invention, a gas turbine includes: the turbine stationary vane according to any one the above (1) to (17); a rotor shaft; and a turbine rotor blade disposed on the rotor shaft.

According to the above configuration (18), the gas turbine includes the turbine stator vane according to any one of the above (1) to (17), and thus it is possible to achieve both of suppression of deterioration of the cooling efficiency and suppression of thermal stress of the turbine stator vane. Accordingly, it is possible to improve the durability of the turbine stator vane, and improve the reliability of the gas turbine.

Advantageous Effects

According to at least one embodiment of the present invention, it is possible to achieve both of suppression of deterioration of the cooling efficiency and suppression of thermal stress of a turbine stator vane.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
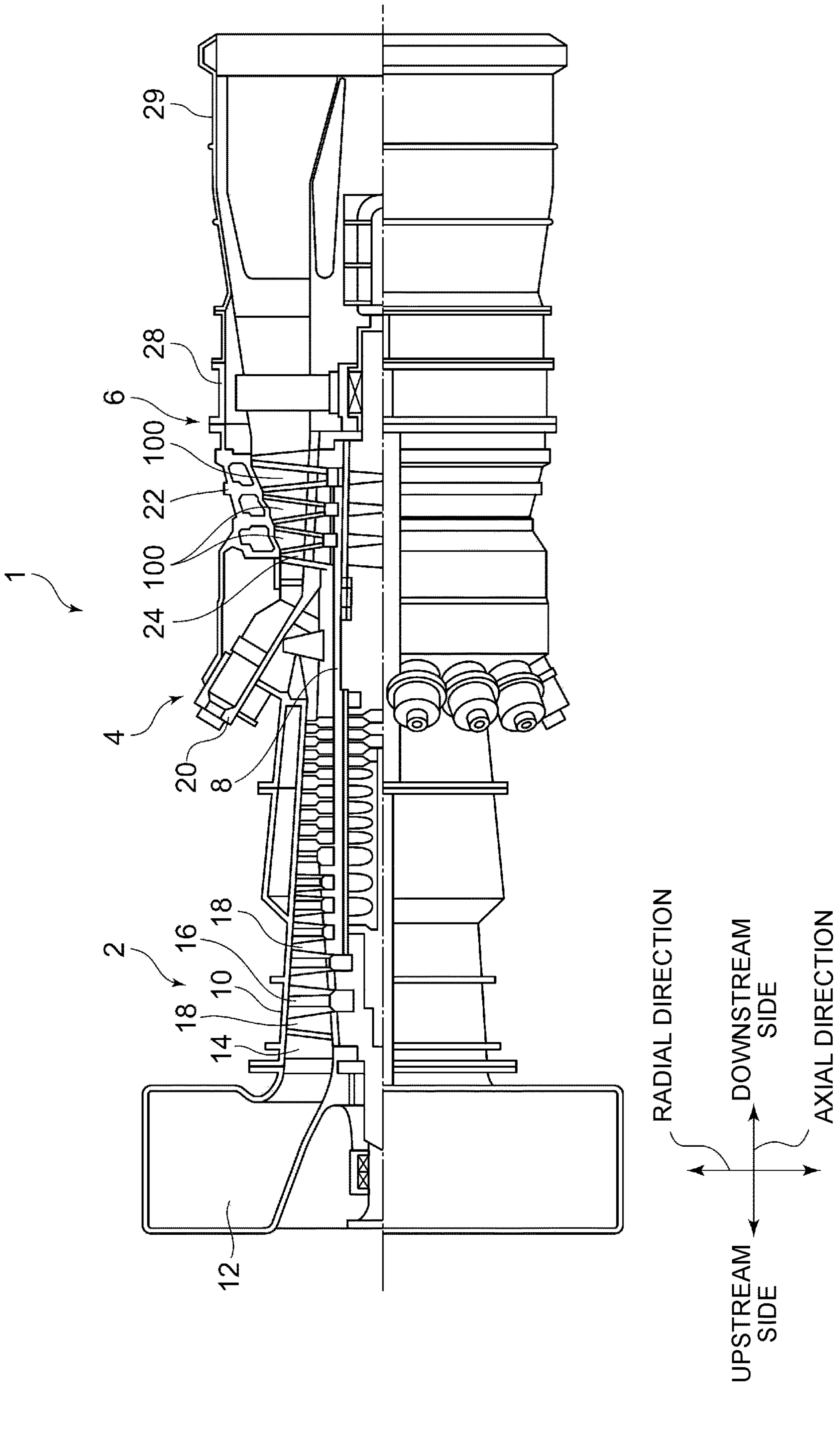
FIG. 1 is a schematic configuration diagram of a gas turbine according to an embodiment using a turbine stator vane according to some embodiments.

Firstly, with reference to FIG. 1, a gas turbine according to some embodiments will be described. FIG. 1 is a schematic configuration diagram of a gas turbine 1 according to an embodiment using a turbine stator vane according to some embodiments.

As depicted in FIG. 1, the gas turbine 1 according to an embodiment includes a compressor 2 for producing compressed air, a combustor 4 for producing combustion gas from the compressed air and fuel, and a turbine 6 configured to be driven by combustion gas to rotate. In the case of the gas turbine 1 for power generation, a generator (not illustrated) is connected to the turbine 6, so that rotational energy of the turbine 6 generates electric power.

With reference to FIG. 1, the configuration example of the respective components of the gas turbine 1 will be described specifically.

The compressor 2 includes a compressor casing 10, an air inlet 12 for sucking in air, disposed on an inlet side of the compressor casing 10, a rotor shaft 8 disposed so as to penetrate through both of the compressor casing 10 and a turbine casing 22 described below, and a variety of blades disposed in the compressor casing 10. The variety of blades includes an inlet guide vane 14 disposed at the side of the air inlet 12, a plurality of compressor stator vanes 16 fixed at the side of the compressor casing 10, and a plurality of compressor rotor blades 18 disposed on the rotor shaft 8 so as to be arranged alternately in the axial direction with the compressor stator vanes 16. The compressor 2 may include other components not illustrated in the drawings, such as an extraction chamber. In the above compressor 2, the air sucked in from the air inlet 12 flows through the plurality of compressor stator vanes 16 and the plurality of compressor rotor blades 18 to be compressed, and thereby compressed air is generated. The compressed air is sent to the combustor 4 of at the downstream side from the compressor 2.

The combustor 4 is disposed in a casing (combustor casing) 20. As depicted in FIG. 1, a plurality of combustors 4 may be disposed in an annular shape centered at the rotor shaft 8 inside the casing 20. The combustor 4 is supplied with fuel and the compressed air produced in the compressor 2, and combusts the fuel to produce combustion gas that has a high pressure and a high temperature and serves as a working fluid of the turbine 6. The combustion gas is sent to the turbine 6 at a latter stage from the combustor 4.

The turbine 6 includes a turbine casing 22 and a variety of turbine blades disposed inside the turbine casing 22. The variety of turbine blades includes a plurality of turbine stator vanes 100 fixed at the side of the turbine casing 22 and a plurality of turbine rotor blades 24 disposed on the rotor shaft 8 so as to be arranged alternately in the axial direction with the turbine stator vanes 100.

In the turbine 6, the rotor shaft 8 extends in the axial direction (the right-left direction in FIG. 1), and the combustion gas flows from the side of the combustor 4 toward the side of the exhaust casing 28 (from the left to the right in FIG. 1). Thus, in FIG. 1, the left side in the drawing is the upstream side in the axial direction, and the right side in the drawing is the downstream side in the axial direction. Furthermore, in the following description, when merely citing "the radial direction", the direction refers to the direction orthogonal to the rotor shaft 8.

The turbine rotor blades 24 are configured to generate a rotational driving force from combustion gas having a high temperature and a high pressure flowing through the turbine casing 22 with the turbine stator vanes 100. As the rotary drive force is transmitted to the rotor shaft 8, the generator coupled to the rotor shaft 8 is driven.

An exhaust chamber 29 is connected to the downstream side, in the axial direction, of the turbine casing 22 via an exhaust casing 28. The combustion gas having driven the turbine 6 passes through the exhaust casing 28 and the exhaust chamber 29 before being discharged outside.

Figure 2:
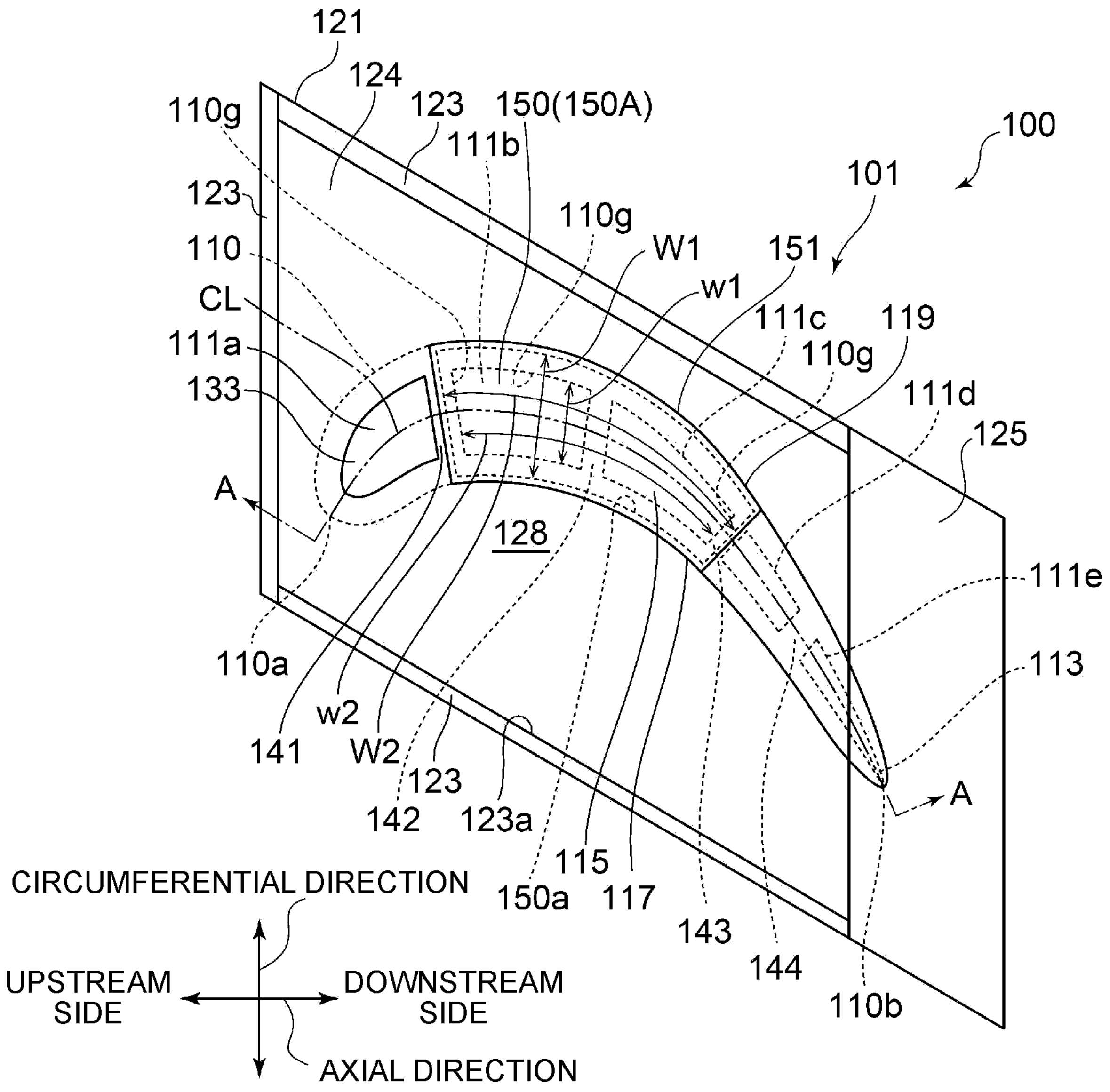
FIG. 2 is a planar view of a turbine stator vane according to an embodiment.
Figure 3:
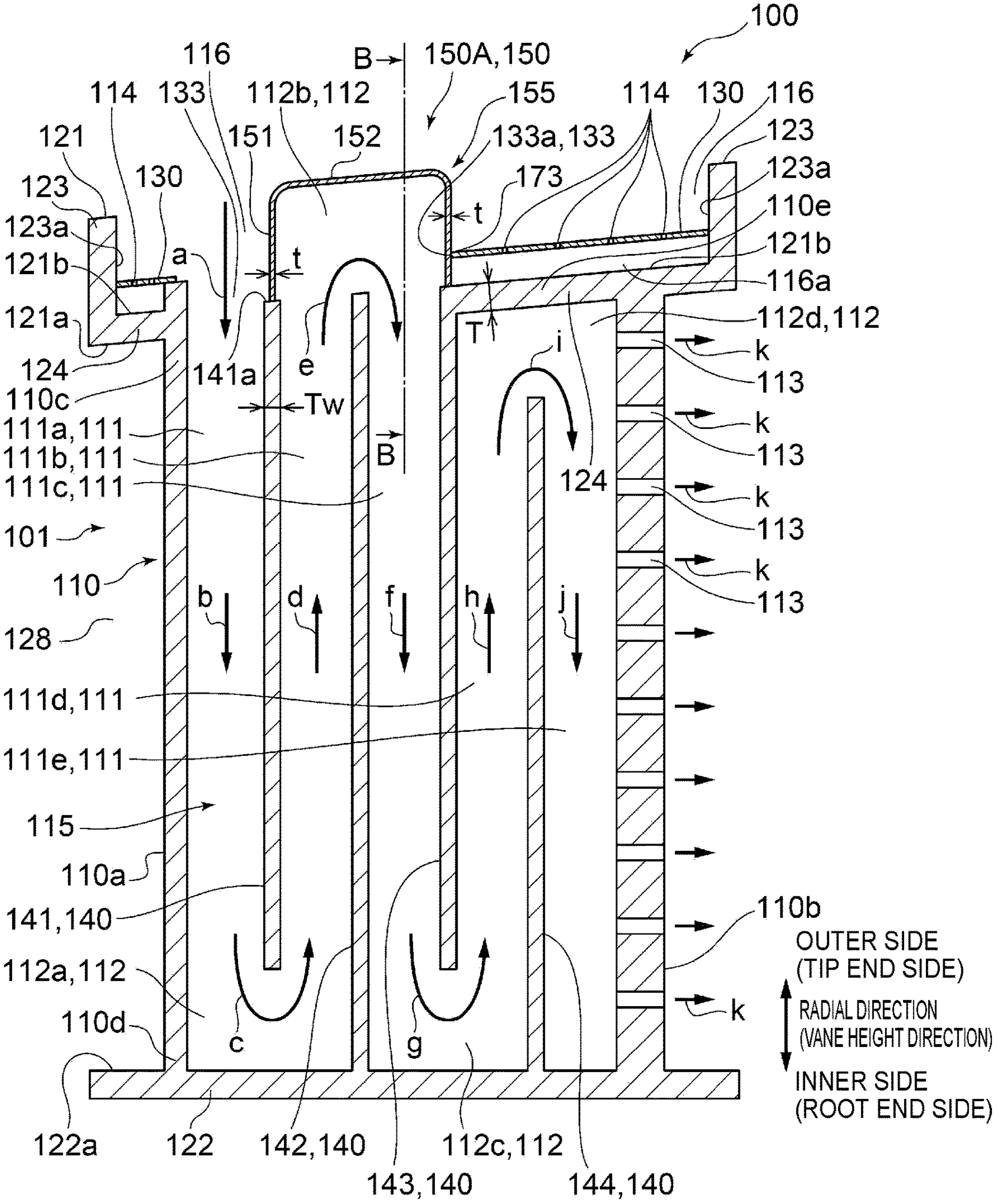
FIG. 3 is an internal cross-sectional view of a turbine stationary vane according to an embodiment (A-A arrow view in FIG. 2).
Figure 4:
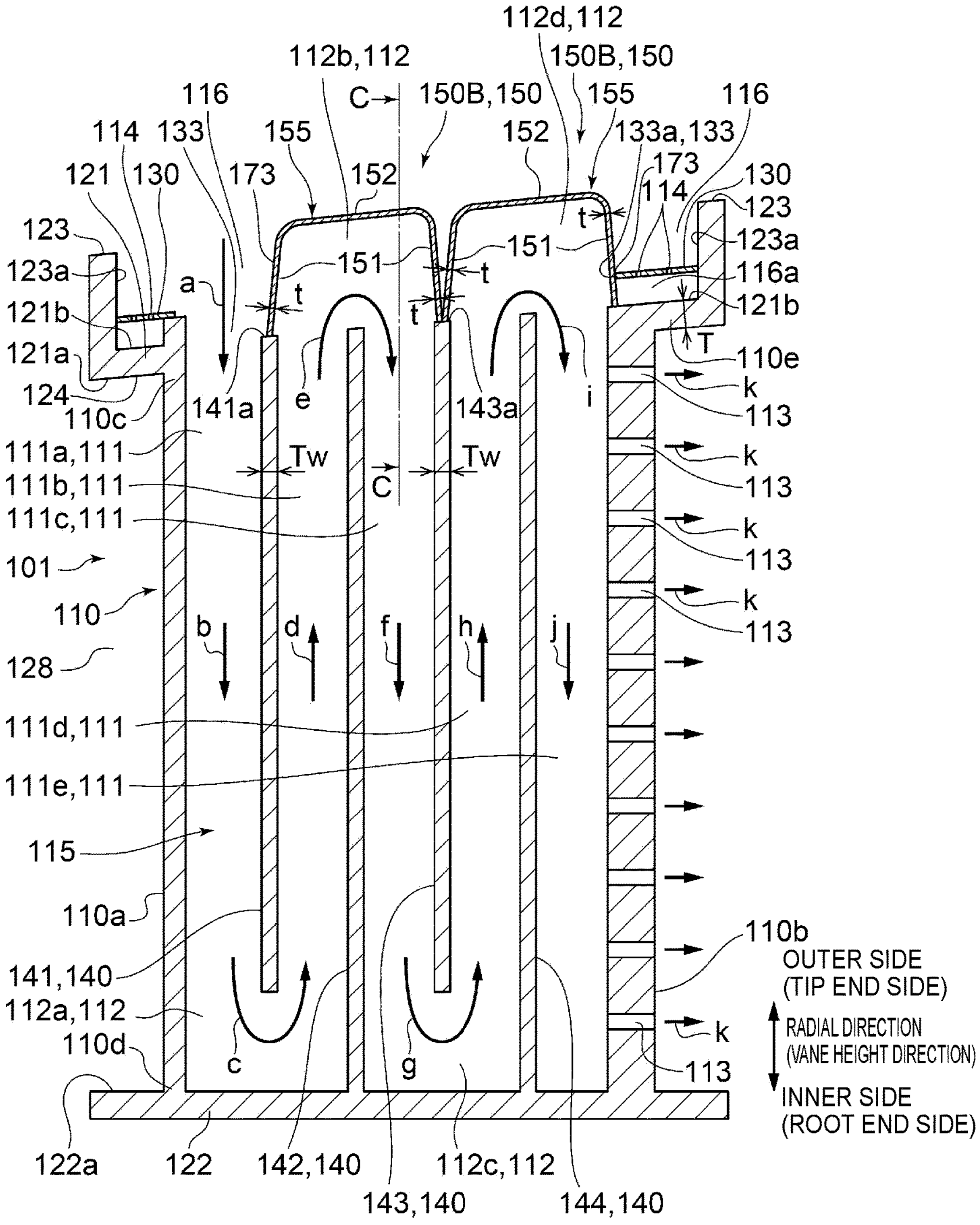
FIG. 4 is an internal cross-sectional view of a turbine stator vane according to another embodiment (A-A arrow view in FIG. 2).
Figure 5:
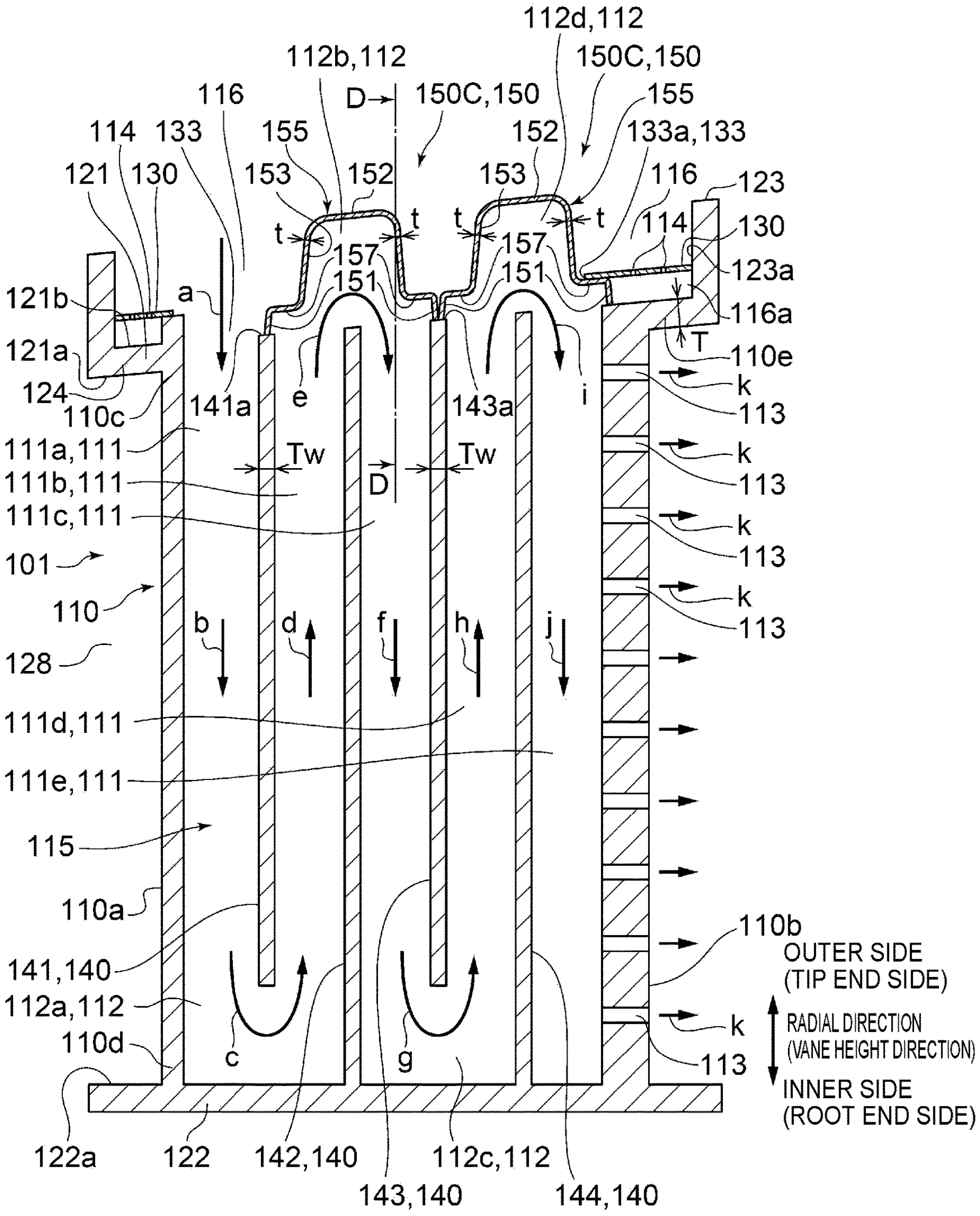
FIG. 5 is an internal cross-sectional view of a turbine stationary vane according to yet another embodiment (A-A arrow view in FIG. 2).
Figure 6:
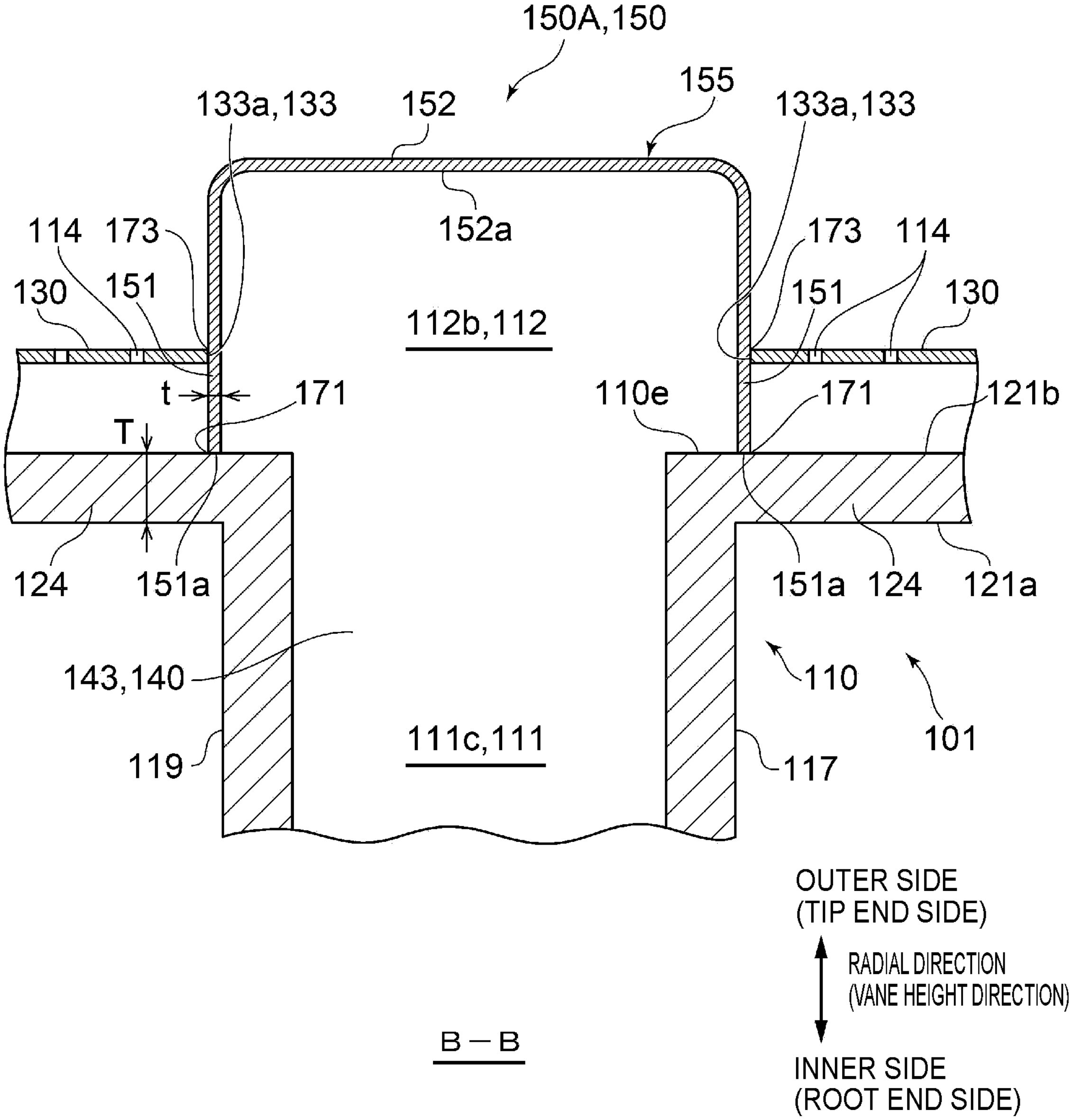
FIG. 6 is a B-B arrow cross-sectional view of a turbine stator vane according to an embodiment depicted in FIG. 3.
Figure 7:
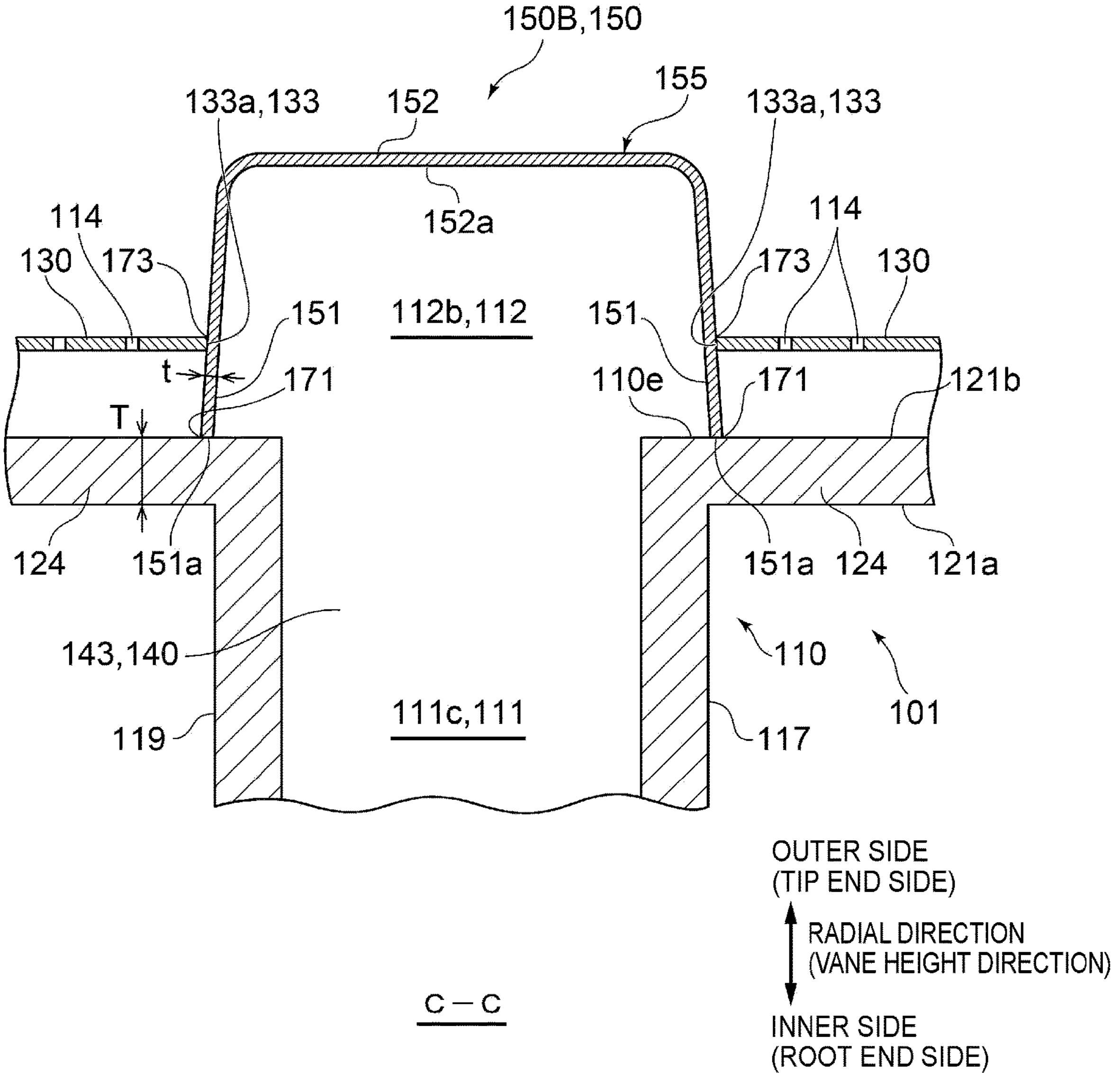
FIG. 7 is a C-C arrow cross-sectional view of a turbine stator vane according to another embodiment depicted in FIG. 4.
Figure 8:
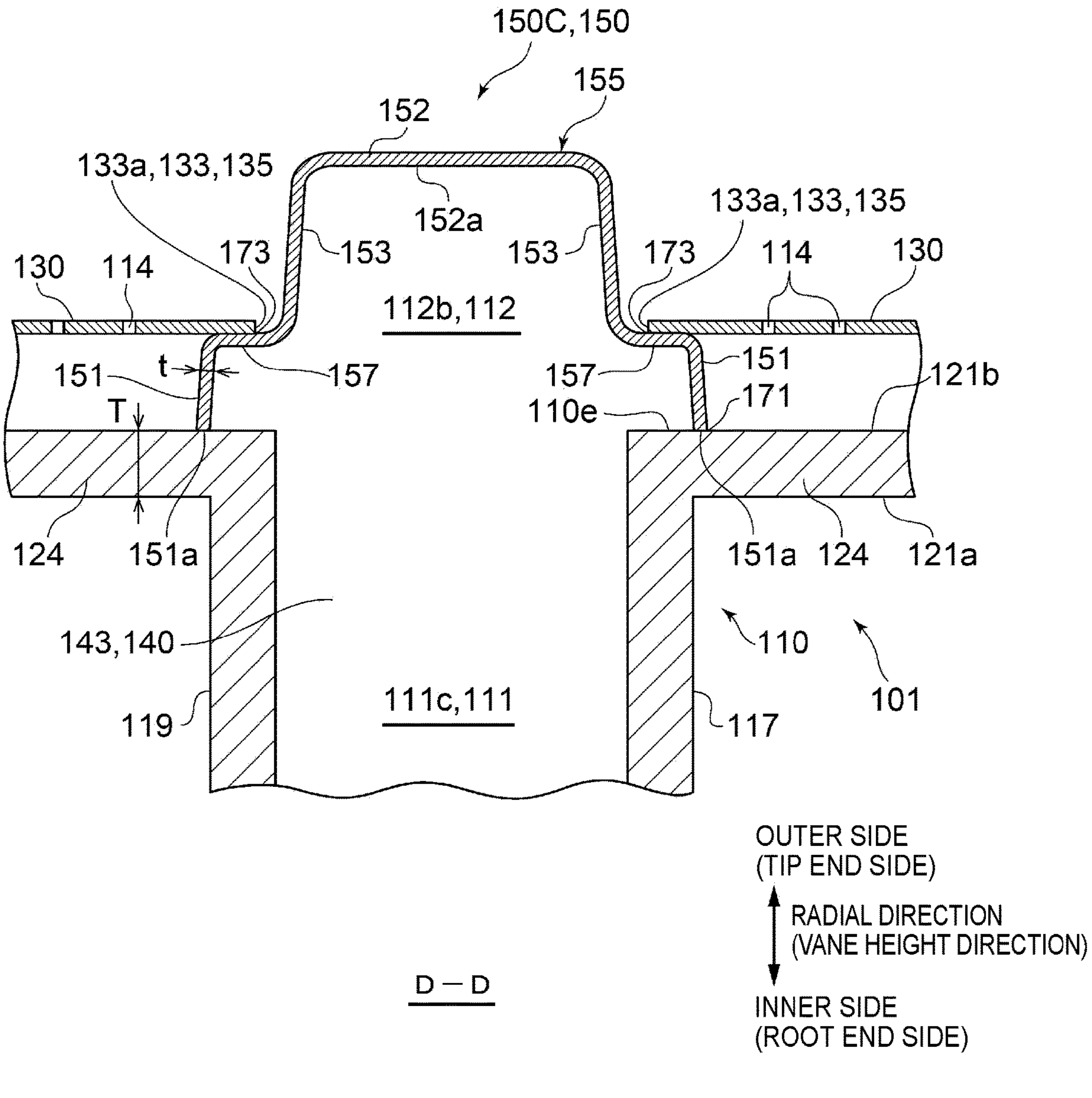
FIG. 8 is a D-D arrow cross-sectional view of a turbine stator vane according to yet another embodiment depicted in FIG. 5.

FIG. 2 is a planar view of a turbine stator vane 100 according to an embodiment. FIG. 3 is an internal cross-sectional view of the turbine stator vane 100 according to an embodiment. FIG. 4 is an internal cross-sectional view of the turbine stator vane 100 according to another embodiment. FIG. 5 is an internal cross-sectional view of the turbine stator vane 100 according to yet another embodiment. FIG. 6 is a B-B arrow cross-sectional view of the turbine stator vane 100 according to an embodiment depicted in FIG. 3. FIG. 7 is a C-C arrow cross-sectional view of the turbine stator vane 100 according to another embodiment depicted in FIG. 4. FIG. 8 is a D-D arrow cross-sectional view of the turbine stator vane 100 according to yet another embodiment depicted in FIG. 5.

As depicted in FIGS. 2 to 5, the turbine stator vane 100 according to some embodiments includes a vane body 101 and a lid portion 150.

The vane body 101 according to some embodiments includes: an airfoil portion 110 having a plurality of cooling flow passages 111 inside; an outer shroud 121 disposed at the side of the tip end 110*c* of the airfoil portion 110, that is, at the outer side in the radial direction; and an inner shroud 122 disposed at the side of the root end 110*d* (root end side) of the airfoil portion 110, that is, at the inner side in the radial direction. In the following description, the radial direction is referred to as the vane height direction of the airfoil portion 110, or merely as the vane height direction. Furthermore, to clarify the description, the plurality of cooling flow passages 111 are called, in order from the side of the leading edge 110*a* toward the side of the trailing edge 110*b* of the airfoil portion 110, the first cooling flow passage 111*a*, the second cooling flow passage 111*b*, the third cooling flow passage 111*c*, the fourth cooling flow passage 111*d*, and the fifth cooling flow passage 111*e*. However, in the following description, when it is not necessary to differentiate the respective cooling flow passages 111*a*, 111*b*, 111*c*, 111*d*, 111*e*, the alphabets suffixed to the description numerals may be omitted, and the cooling flow passages may be referred to as merely the cooling flow passages 111.

In the turbine stator vane 100 according to some embodiments, the plurality of cooling flow passages 111 are partitioned by partition walls 140. That is, the first cooling flow passage 111*a* and the second cooling flow passage 111*b* are partitioned by the first partition wall 141. The second cooling flow passage 111*b* and the third cooling flow passage 111*c* are partitioned by the second partition wall 142. The third cooling flow passage 111*c* and the fourth cooling flow passage 111*d* are partitioned by the third partition wall 143. The fourth cooling flow passage 111*d* and the fifth cooling flow passage 111*e* are partitioned by the fourth partition wall 144. In the following description, when it is not necessary to differentiate the respective partition walls 141 to 144, the partition walls may be merely referred to as the partition walls 140.

The lid portion 150 according to some embodiments is a separate member from the airfoil portion 110, and is attached to the outer shroud 121 and the inner shroud 122 opposite to the airfoil portion 110 across the gas path surface in the vane height direction of the airfoil portion 110. The lid portion 150 according to some embodiments forms a turn-back flow passage 112 which brings into communication a pair of adjacent cooling flow passages 111 of the plurality of cooling flow passages 111. Furthermore, the gas path surface is a surface that contacts with the combustion gas in a case where the turbine stator vane 100 according to some embodiments is disposed in a turbine, and corresponds to the outer surfaces 121*a*, 122*a* of the outer shroud 121 and the inner shroud 122 depicted in FIGS. 2 to 5. In the turbine stator vane 100 according to some embodiments, while the airfoil portion 110 and the shrouds 121, 122 are produced by casting, for instance, the lid portion 150 is made of sheet metal, for instance.

In the turbine stator vane 100 according to some embodiments depicted in FIGS. 2 to 5, four turn-back flow passages 112 are formed. Specifically, in order from the side of the leading edge 110*a*, the first turn-back flow passage 112*a* brings the first cooling flow passage 111*a* and the second cooling flow passage 111*b* into communication, and the second turn-back flow passage 112*b* brings the second cooling flow passage 111*b* and the third cooling flow passage 111*c* into communication. The third turn-back flow passage 112*c* brings the third cooling flow passage 111*c* and the fourth cooling flow passage 111*d* into communication, and the fourth turn-back flow passage 112*d* brings the fourth cooling flow passage 111*d* and the fifth cooling flow passage 111*e* into communication.

In the turbine stator vane 100 according to an embodiment depicted in FIGS. 2 and 3, of the four turn-back flow passages 112, the turn-back flow passage 112*b* which brings the second cooling flow passage 111*b* and the third cooling flow passage 111*c* into communication is formed by the lid portion 150A.

In the turbine stator vane 100 according to another embodiment depicted in FIG. 4, of the four turn-back flow passages 112, the turn-back flow passage 112*b* which brings the second cooling flow passage 111*b* and the third cooling flow passage 111*c* into communication and the turn-back flow passage 112*d* which brings the fourth cooling flow passage 111*d* and the fifth cooling flow passage 111*e* into communication are formed by the lid portions 150B.

In the turbine stator vane 100 according to yet another embodiment depicted in FIG. 5, of the four turn-back flow passages 112, the turn-back flow passage 112*b* which brings the second cooling flow passage 111*b* and the third cooling flow passage 111*c* into communication and the turn-back flow passage 112*d* which brings the fourth cooling flow passage 111*d* and the fifth cooling flow passage 111*e* into communication are formed by the lid portions 150C.

Furthermore, in the turbine stator vane 100 according to an embodiment depicted in FIG. 3, two lid portions 150A may form the turn-back flow passage 112*d* which brings the second cooling flow passage 111*b* and the third cooling flow passage 111*c* into communication, and the turn-back flow passage 112*d* which brings the fourth cooling flow passage 111*d* and the fifth cooling flow passage 111*e* into communication. Furthermore, in the turbine stator vane 100 according to an embodiment depicted in FIG. 3, a single lid portion 150A may form the turn-back flow passage 112*d* which brings the fourth cooling flow passage 111*d* and the fifth cooling flow passage 111*e* into communication.

In the turbine stator vane 100 according to another embodiment depicted in FIG. 4, a single lid portion 150B may form only one of the turn-back flow passage 112*b* which brings the second cooling flow passage 111*b* and the third cooling flow passage 111*c* into communication, or the turn-back flow passage 112*d* which brings the fourth cooling flow passage 111*d* and the fifth cooling flow passage 111*e* into communication.

Similarly, in the turbine stator vane 100 according to another embodiment depicted in FIG. 5, a single lid portion 150C may form only one of the turn-back flow passage 112*b* which brings the second cooling flow passage 111*b* and the third cooling flow passage 111*c* into communication, or the turn-back flow passage 112*d* which brings the fourth cooling flow passage 111*d* and the fifth cooling flow passage 111*e* into communication.

Meanwhile, in the turbine stator vane 100 according to some embodiments depicted in FIGS. 2 to 5, at least one of the two turn-back flow passages 112*b*, 112*d* at the outer side in the radial direction is formed by the lid portion 150 and positioned at the outer shroud 121. Nevertheless, at least one of the two turn-back flow passages 112*a*, 112*c* at the inner side in the radial direction may be formed by the lid portion 150 and positioned at the inner shroud (see FIG. 10 described below).

Inside each cooling flow passage 111, a plurality of ribs (not depicted) having a protruding shape are disposed to promote heat transmission to the cooling medium. Furthermore, in the vicinity of the trailing edge 110*b* of the airfoil portion 110, a plurality of cooling holes 113 are formed so as to be in communication with the fifth cooling flow passage 111*e* at the upstream side in the flow direction of the cooling medium, and the cooling holes 113 have, at the downstream side, openings at the end portion of the trailing edge 110*b*.

In the turbine stator vane 100 according to some embodiments depicted in FIGS. 2 to 5, a serpentine flow passage 115 is formed, which includes the plurality of cooling flow passages 111 and the plurality of turn-back flow passages 112.

The turbine stator vane 100 according to some embodiments depicted in FIGS. 2 to 5 includes, as described above, the airfoil portion 110, the outer shroud 121 connected at the side of the tip end 110*c* of the airfoil portion 110, and the inner shroud 122 connected at the side of the root end 110*d* of the airfoil portion 110. Furthermore, the outer shroud 121 and the inner shroud 122 include a bottom portion 124 which forms the gas path surface, an outer wall portion 123 extending opposite to the gas path surface in the vane height direction from opposite ends, in the axial direction and the circumferential direction, of the bottom portion 124, a trailing edge end portion 125, and an impingement plate 130 fixed to the outer wall portion 123.

As a cooling medium supplied to the turbine stator vane 100, for instance, compressed air extracted from the compressor 2 is used.

In the turbine stator vane 100 according to some embodiments depicted in FIGS. 2 to 5, the cooling medium supplied to the serpentine flow passage 115 is supplied to the internal space 116 of the outer shroud 121 from outside, as indicated by the arrow 'a'. The cooling medium flows into the first cooling flow passage 111*a* via the opening 133 formed on the inner surface 121*b* of the outer shroud 121, and as indicated by the arrow 'b', flows through the first cooling flow passage 111*a* along the vane height direction from the side of the tip end 110*c* toward the side of the root end 110*d*. Then, after flowing through the first cooling flow passage 111*a*, the cooling medium flows through the turn-back flow passage 112*a*, the cooling flow passage 111*b*, the turn-back flow passage 112*b*, the cooling flow passage 111*c*, the turn-back flow passage 112*c*, the cooling flow passage 111*d*, the turn-back flow passage 112*d*, and the cooling flow passage 111*e*, in this order, as indicated by the arrows 'c' to 'j'. As described above, the cooling medium flows in the same direction as the main flow direction of the combustion gas, from the side of the leading edge 110*a* toward the side of the trailing edge 110*b*, inside the airfoil portion 110.

The cooling medium after flowing through the cooling flow passage 111*e* is, as indicated by the arrow 'k', discharged into the combustion gas outside the airfoil portion 110 from the plurality of cooling holes 113 that have openings on the trailing edge 110*b*.

Furthermore, in the turbine stator vane 100 according to some embodiments depicted in FIGS. 2 to 5, via the plurality of through holes 114 formed on the impingement plate 130, the cooling medium supplied from the outside into the region (internal space 116) at the outer side (the side of the tip end 110*c*), in the radial direction, of the impingement plate 130, is injected onto the inner surface 121*b* at the outer side (the side of the tip end 110*c*), in the radial direction, of the bottom portion 124 of the outer shroud 121. The cooling medium cools the inner surface 121*b* through impingement (impingement cooling). Accordingly, it is possible to cool the bottom portion 124 of the outer shroud 121 with the cooling medium.

As described above, at the turn-back flow passage 112, the flow velocity of the cooling medium may decrease, and the heat transfer coefficient may deteriorate. Thus, in the turbine stator vane 100 according to some embodiments depicted in FIGS. 2 to 5, as described above, at least a part of the turn-back flow passage 112 is formed by the lid portion 150 mounted to the tip end 110*c* of the airfoil portion 110 of the outer shroud 121.

Accordingly, it is possible to position the turn-back flow passage 112 farther from the region where the combustion gas flows. In the vicinity of the center of the turn-back flow passage 112, the direction of the flow of the cooling medium changes at the turn-back flow passage 112, and thus the flow velocity in the vicinity of the center of the turn-back flow passage 112 decreases and the heat transfer coefficient deteriorates, whereby the metal temperature is likely to become high. Thus, by positioning the lid portion 150 forming the turn-back flow passage 112 at the outer side, in the radial direction, from the gas path surface, it is possible to position the center region of the turn-back flow passage 112 farther from the region where the combustion gas flows. Accordingly, it is possible to suppress overheating of the wall portion of the turn-back flow passage 112.

Furthermore, in the turbine stator vane 100 according to some embodiments depicted in FIGS. 2 to 5, the region where the combustion gas flows is a region between the outer surface 121_a_, at the side of the root end 110_d_, of the outer shroud 121 and the outer surface 122_a_ at the outer side (the side of the tip end 110_c_), in the radial direction, of the inner shroud 122. The outer surface 121_a_ of the outer shroud 121 and the outer surface 122_a_ of the inner shroud 122 that make contact with combustion gas are gas path surfaces.

With the turn-back flow passage 112 positioned away from the region where the combustion gas flows, the metal temperature of the lid portion 150 forming the turn-back flow passage 112 decreases. Thus, the temperature difference between the lid portion 150 and the outer end portion 110_e_ and the inner end portion 110_f_ (see FIG. 10) at the side of the tip end 110_c_ and the side of the root end 110_d_ of the airfoil portion 110 increases, and the thermal stress at the lid portion 150 may increase due to the thermal expansion difference between the lid portion 150 and the outer end portion 110_e_ or the inner end portion 110_f_.

With this regard, in the turbine stator vane 100 according to some embodiments depicted in FIGS. 2 to 5, the minimum value of the thickness 't' of the lid portion 150 is smaller than the thickness T of the outer end portion 110_e_ of the airfoil portion 110 to which the lid portion 150 is mounted, of the outer shroud 121. Accordingly, the thermal expansion difference between the lid portion 150 and the outer end portion 110_e_ or the inner end portion 110_f_ is absorbed, and thus it is possible to suppress thermal stress that acts on the lid portion 150.

Furthermore, the gas turbine 1 according to an embodiment includes the stator vane 100 according to some embodiments depicted in FIGS. 2 to 5, and thus it is possible to achieve both of suppression of deterioration of the cooling efficiency and suppression of thermal stress at the turbine stator vane 100. Accordingly, it is possible to improve the durability of the turbine stator vane 100, and improve the reliability of the gas turbine 1.

In some embodiments depicted in FIGS. 2 to 8, the lid portion 150 forms the turn-back flow passage 112, and thus, for instance, includes a circumferential wall portion 151 (first portion) standing from the inner surface 121_b_ of the bottom portion 124 at the outer side (the side of the tip end 110_c_), in the radial direction, of the outer shroud 121 and extending in the vane height direction, and a top portion 152 (second portion) including a top inner surface 152_a_ corresponding to an end portion, in the vane height direction, of the turn-back flow passage 112 and extending in the axial direction different from the direction of the circumferential wall portion 151 (see FIGS. 6 to 8).

As depicted in FIGS. 2 and 6, the lid portion 150 is disposed so as to stand from the inner surface 121_b_ of the bottom portion 124 at the outer side (the side of the tip end 110_c_), in the radial direction, of the outer shroud 121. Specifically, as described above, the lid portion 150 is a separate member from the airfoil portion 110. The pressure-suction direction lid width W1 of the inner wall 150_a_ in the pressure-suction direction of the lid portion 150 is formed to be greater than the pressure-suction direction flow passage width w1 of the cooling flow passage 111 (W1>w1), and is formed such that the flow-passage cross-sectional area within the lid portion 150 is greater than the flow-passage cross-sectional area of the cooling flow passage 111. Furthermore, the camber-line direction lid width W2 of the inner wall 150_a_ in the direction along the camber line CL is also formed to be greater than the camber-line direction flow passage width w2 in the direction along the camber line CL between the inner wall surface 110_g_ at the side of the leading edge 110_a_ of the cooling flow passage 111_b_ and the inner wall surface 110_g_ at the side of the trailing edge 110_b_ of the cooling flow passage 111_c_. It is desirable to fix the lid portion 150 such that the lid widths W1, W2 and the flow passage widths w1, w2 are the same. However, concerning the manufacturing errors and the like, the lid portion 150 is welded to the airfoil portion 110 by welding or the like such that the lid widths W1, W2 are slightly greater than the flow passage widths w1, w2. The lid portion 150 is formed such that the flow-passage cross-sectional area of the lid portion 150 is greater than the flow-passage cross-sectional area of the cooling flow passage 111, and the lid width of the lid portion 150 is greater than the flow passage width of the cooling flow passage 111. Accordingly, it is possible to avoid the lid widths W1, W2 upon completion being smaller than the flow passage widths w1, w2, and avoid an increase in pressure loss of the cooling medium at the turn-back flow passage.

Furthermore, the circumferential wall portion 151 may extend in the same direction as the vane height direction like the lid portion 150A depicted in FIGS. 3 and 6, and may be oblique with respect to the vane height direction like the lid portion 150B depicted in FIGS. 4 and 7.

In yet another embodiment depicted in FIGS. 5 and 8, the lid portion 150C includes a plate support portion 157 extending along the circumferential edge portion 135 (see FIG. 8) of the opening 133 of the impingement plate 130 so as to support the circumferential edge portion 135. The plate support portion 157 has an end portion, at the outer peripheral side, connected to an end portion, at the outer side in the radial direction, of the circumferential wall portion 151. Furthermore, at an end portion, at the inner peripheral side of the plate support portion 157, an upper circumferential wall portion 153 (third portion) is disposed so as to stand and extend in the vane height direction. In yet another embodiment depicted in FIGS. 5 and 8, the top portion 152 (second portion) has an end portion, at the outer peripheral side, connected to an end portion, at the outer side in the radial direction, of the upper circumferential wall portion 153 (third portion). Furthermore, in the lid portion 150C according to yet another embodiment depicted in FIGS. 5 and 8, at least one of the circumferential wall portion 151 or the upper circumferential wall portion 153 may extend in the same direction as the vane height direction, like the circumferential wall portion 151 of the lid portion 150A depicted in FIGS. 3 and 6.

As depicted in FIGS. 2, 3, 5, 6, and 8, the lid portion 150 is a lid member having a rectangular shape and formed of a thin plate, having curved sides in the top cross-sectional view as seen in the vane height direction, which conform to the vane shape at the suction side and the pressure side, and including a space inside thereof, the space being recessed toward the outer side in the radial direction from the end portion 151_a_ at the inner side, in the vane height direction, of the lid portion 150. The lid portion 150 is formed of a single thin plate by press molding, for instance. The lid portion 150 includes a circumferential wall portion 151 forming the circumferential wall surface of the lid portion 150, and a top portion 152 forming the top surface of the lid. Furthermore, as depicted in FIGS. 5 and 8, the lid portion 150 may include the plate support portion 157 expanded to have a step shape at the outer peripheral side that supports the circumferential edge portion 135 of the above described impingement plate 130.

In the turbine stator vane 100 according to some embodiments depicted in FIGS. 2 to 8, the lid portion 150 is fixed to the outer shroud 121 via the welding portion 171 as depicted in FIGS. 6 to 8.

Accordingly, it is possible to fix the lid portion 150 being a separate member from the airfoil portion 110 to the airfoil portion 110 via the outer shroud 121.

In the turbine stator vane 100 according to some embodiments depicted in FIGS. 2 to 8, the minimum value of the thickness 't' of the lid portion 150 extending in the vane height direction at the lid portion 150 is smaller than the thickness T of the outer end portion 110*e* of the airfoil portion 110 to which the lid portion 150 is mounted, of the outer shroud 121.

The circumferential wall portion 151 is mounted to the outer shroud 121 via an end portion 151*a* of the circumferential wall portion 151 at the side of the outer shroud 121. Thus, the circumferential wall portion 151 is positioned at a position closer to the outer shroud 121 than the top portion 152.

Herein, according to the turbine stator vane 100 according to some embodiments depicted in FIGS. 2 to 8, the minimum value of the thickness T of the circumferential wall portion 151 extending in the vane height direction at the lid portion 150 is smaller than the thickness T of the outer end portion 110*e* of the airfoil portion 110 to which the lid portion 150 is mounted, and thereby the thickness 't' of a portion (circumferential wall portion 151) closer to the airfoil portion 110 is smaller than the thickness T of the outer end portion 110*e* of the airfoil portion 110 to which the lid portion 150 is mounted. Accordingly, it is possible to make it relatively easier to absorb thermal extension difference between the airfoil portion 110 and the lid portion 150. Furthermore, the metal temperature is lower than that of the airfoil portion 110, and thus it is possible to effectively suppress thermal stress that acts on the lid portion 150.

In the turbine stator vane 100 according to some embodiments depicted in FIGS. 2 to 5, the minimum value of the thickness 't' of the circumferential wall portion 151 extending in the vane height direction at the lid portion 150 is smaller than the thickness Tw of the partition wall 140 partitioning the plurality of cooling flow passages.

In the turbine stator vane 100 according to some embodiments depicted in FIGS. 2 to 8, the minimum value of the thickness 't' of the circumferential wall portion 151 extending in the vane height direction at the lid portion 150 is smaller than the thickness Tw of the partition wall 140, and thus, even when the partition wall 140 is connected to the circumferential wall portion 151, extending in the vane height direction, of the lid portion 150 as described above, it is possible to effectively suppress thermal stress which acts on the lid portion 150.

In the turbine stator vane 100 according to some embodiments depicted in FIGS. 2 to 8, the outer shroud 121 and the inner shroud 122 include an impingement plate 130. In the turbine stator vane 100 according to some embodiments depicted in FIGS. 2 to 8, the lid portion 150 includes a protruding portion 155 protruding toward the opposite side to the airfoil portion 110 from the opening 133 of the airfoil portion 110 in the vane height direction.

Accordingly, it is possible to increase the size of the lid portion 150 in the vane height direction, and thus it is possible to position the region where a change in the flow of the cooling medium at the turn-back flow passage 112 causes a decrease in the flow velocity and deterioration of the heat transfer coefficient farther away from the region where the combustion gas flows. Accordingly, it is possible to suppress overheating of the wall portion of the turn-back flow passage 112.

Furthermore, in the turbine stator vane 100 according to some embodiments depicted in FIGS. 2 to 8, a radially inner end 133*a* of the opening 133 of the impingement plate 130 and the lid portion 150 are fixed to one another via a welding portion 173.

In the turbine stator vane 100 according to yet another embodiment depicted in FIGS. 5 and 8, as described above, the lid portion 150C includes a plate support portion 157 extending along the circumferential edge portion 135 so as to support the circumferential edge portion 135 of the opening 133 of the impingement plate 130. Furthermore, in the turbine stator vane 100 according to yet another embodiment depicted in FIGS. 5 and 8, the impingement plate 130 is fixed to the plate support portion 157 of the lid portion 150 via the welding portion 173.

In the turbine stator vane 100 according to some embodiments depicted in FIGS. 5 and 8, with the plate support portion 157 formed on the lid portion 150C, although not depicted, it is possible to prevent the radially inner end 133*a* of the opening 133 from being off from the plate support portion 157 of the lid portion 150, even when the size of the opening 133 is somewhat larger than the size of the protruding portion 155 as seen in the vane height direction. Similarly, with the plate support portion 157 formed on the lid portion 150C, although not depicted, it is possible to prevent the radially inner end 133*a* of the opening 133 from being off from the plate support portion 157 of the lid portion 150, even when the position of the opening 133 is somewhat offset from the position of the protruding portion 155.

Thus, as depicted in FIGS. 5 and 8, in the turbine stator vane 100 according to yet another embodiment, it is easier to determine the position of the impingement plate 130 with respect to the lid portion 150, and it is easier to mount the impingement plate 130.

In the turbine stator vane 100 according to some embodiments depicted in FIGS. 2 to 5, the lid portion 150 is fixed to the partition wall 140 via a part of the welding portion 171.

Accordingly, it is possible to fix the lid portion 150 fabricated to have a relatively small thickness compared to the airfoil portion 110 and the shrouds 121, 122 to the partition wall 140 via a part of the welding portion 171.

In the turbine stator vane 100 according to some embodiments depicted in FIGS. 2 to 8, as described above, the lid portion 150 is made of sheet metal, and thus it is possible to easily produce the lid portion 150 having the thickness 't' whose minimum value is smaller than the thickness T of the outer end portion 110*e* of the airfoil portion 110 to which the lid portion 150 is mounted.

In the turbine stator vane 100 according to some embodiments depicted in FIGS. 2 to 8, the lid portion 150 may include a material having a lower heat-resistant temperature than a material of the airfoil portion 110 of the lid portion 150. That is, as described above, the lid portion 150 is formed at the opposite side to the airfoil portion 110 across the outer shroud 121 in the vane height direction, and thus it is possible to position the lid portion 150 farther from the region where the combustion gas flows. Accordingly, the heat-resistant temperature required for the lid portion 150 is lower than the heat-resistant temperature required for the vane body 101. Thus, with the lid portion 150 including a material having a lower heat-resistant temperature than the material of the vane body 101, it is possible to suppress the costs of the lid portion 150.

Figure 10:
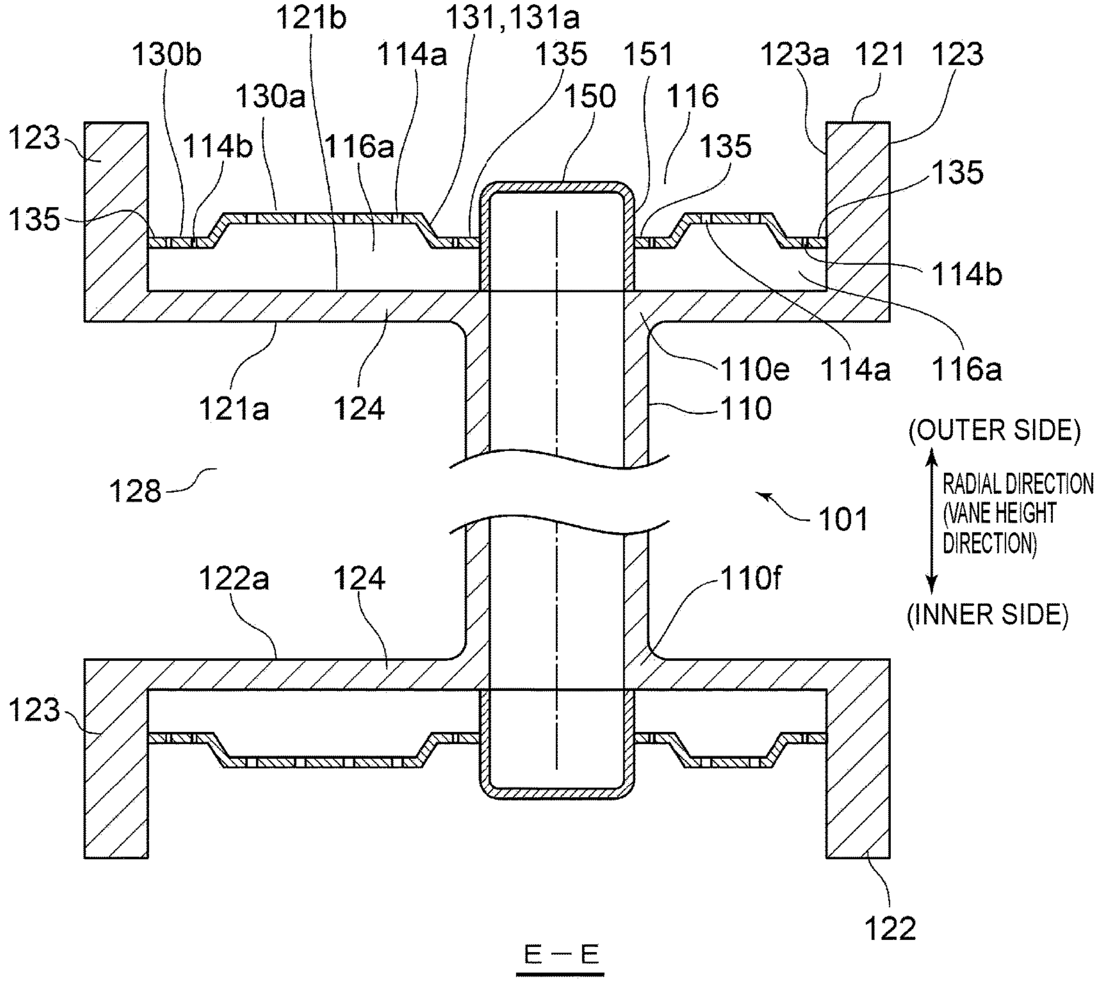
FIG. 10 is an E-E arrow cross-sectional view of the turbine stator vane depicted in FIG. 9.

While the lid portion 150 is mounted at the side of the outer shroud 121 in the aspect described above, the lid portion 150 may be mounted at the side of the inner shroud 122. As depicted in FIG. 10 (described below), the lid portion 150 may be fixed to an end surface of the airfoil portion 110 at the inner side, in the vane height direction, at the side of the inner shroud 122. In a case where the lid portion 150 is mounted at the side of the outer shroud 121 as described above, for instance, as depicted in FIG. 3, the lid portion 150 (150A) is mounted to the turn-back flow passage 112*b* which is in communication with the second cooling flow passage 111*b* and the third cooling flow passage 111*c*. On the other hand, in a case where the lid portion 150 is mounted at the side of the inner shroud 122, it is possible to mount the lid portion 150 to at least one of the turn-back flow passage 112*a* which is in communication with the first cooling flow passage 111*a* and the second cooling flow passage 111*b*, or the turn-back flow passage 112*c* which is in communication with the third cooling flow passage 111*c* and the fourth cooling flow passage 111*d*.

Figure 9:
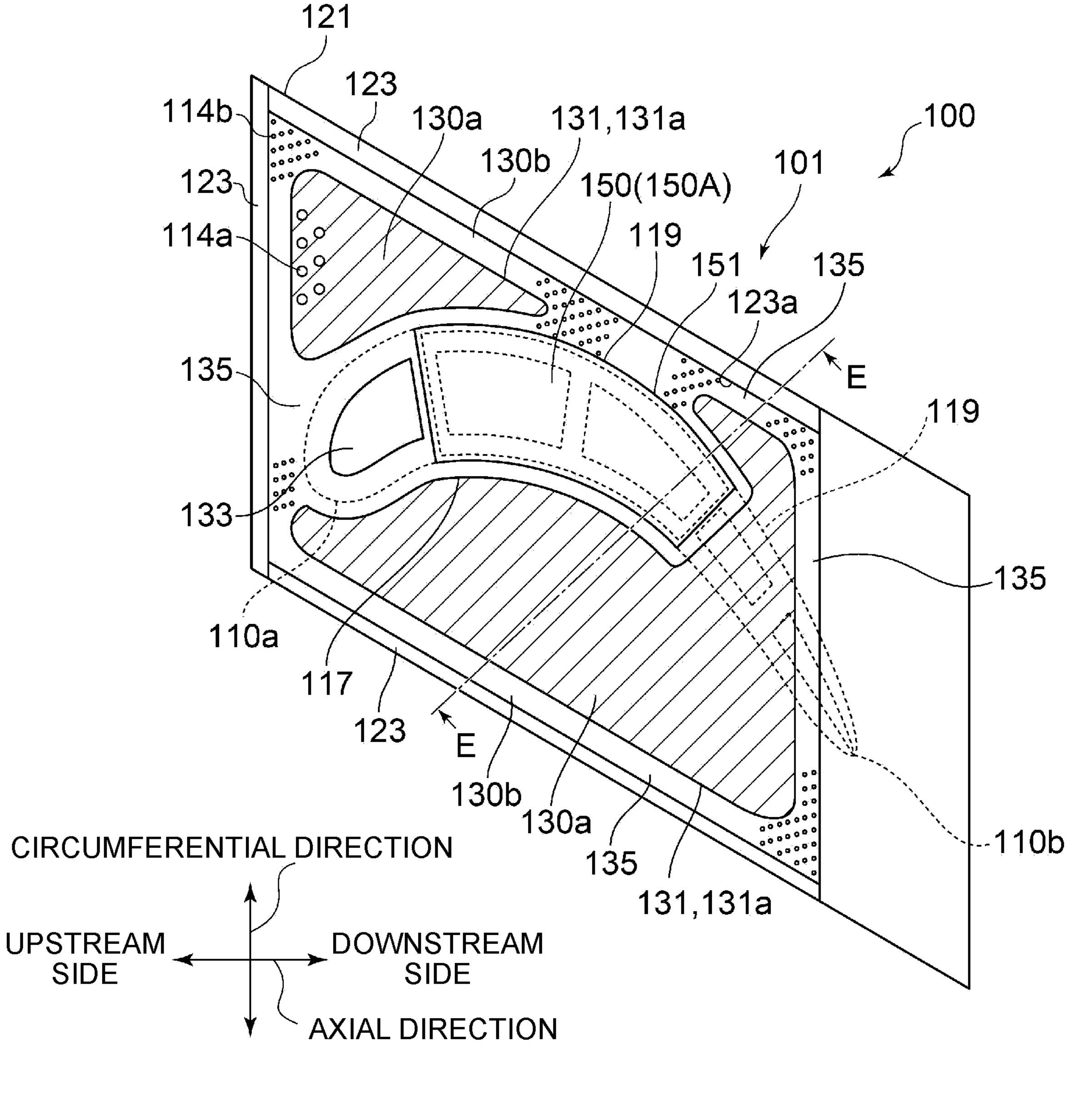
FIG. 9 is a planar view of a turbine stator vane according to another embodiment.
Figure 11:
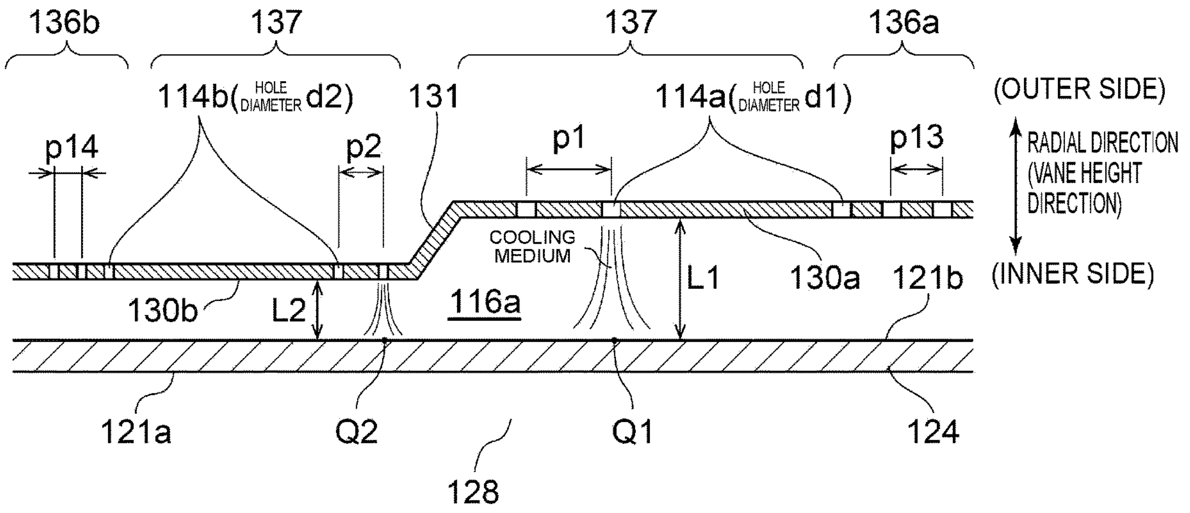
FIG. 11 is an explanatory diagram of impingement cooling of an area around a step portion of an impingement plate.
Figure 12:
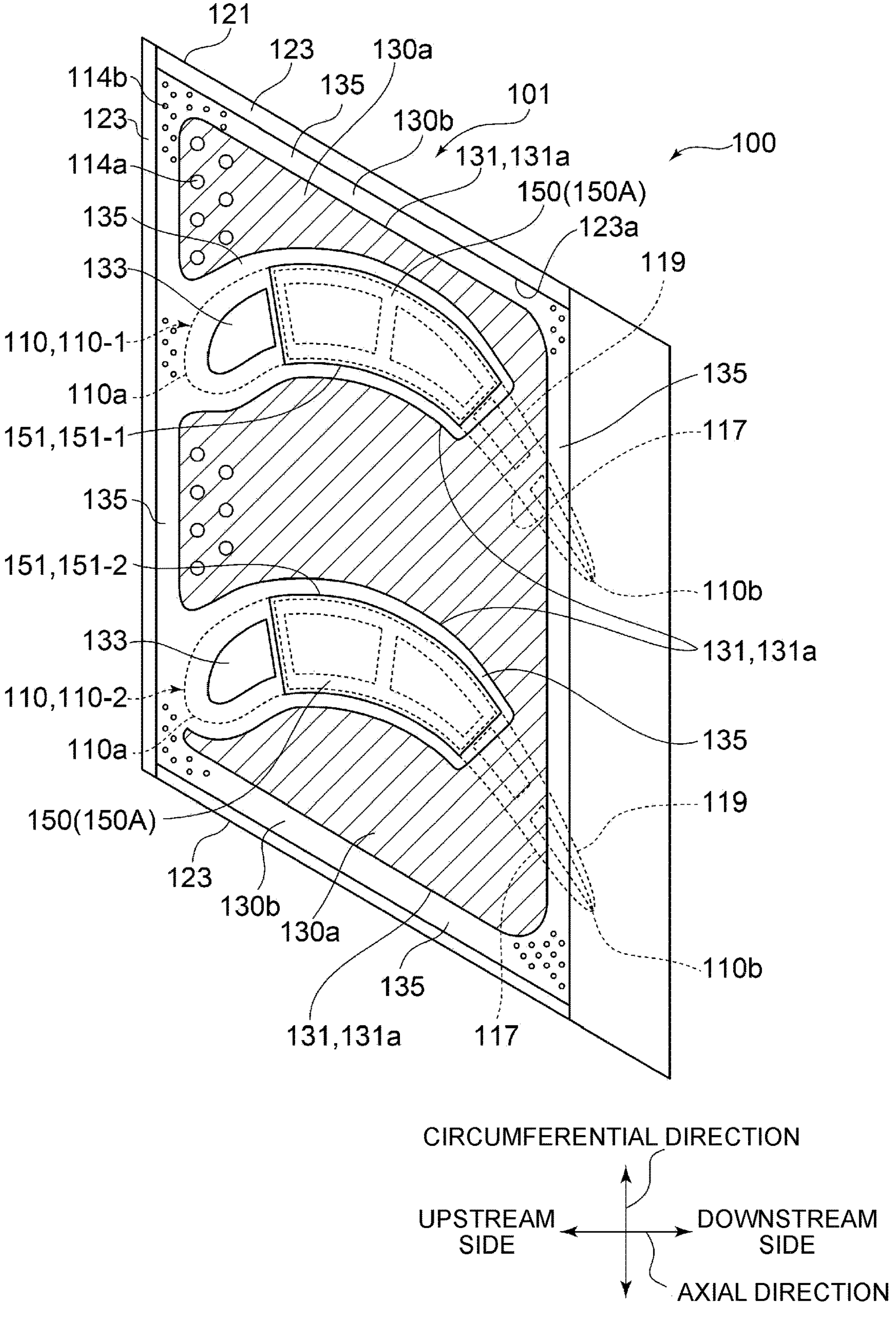
FIG. 12 is a planar view of a turbine stator vane according to another embodiment.
Figure 13:
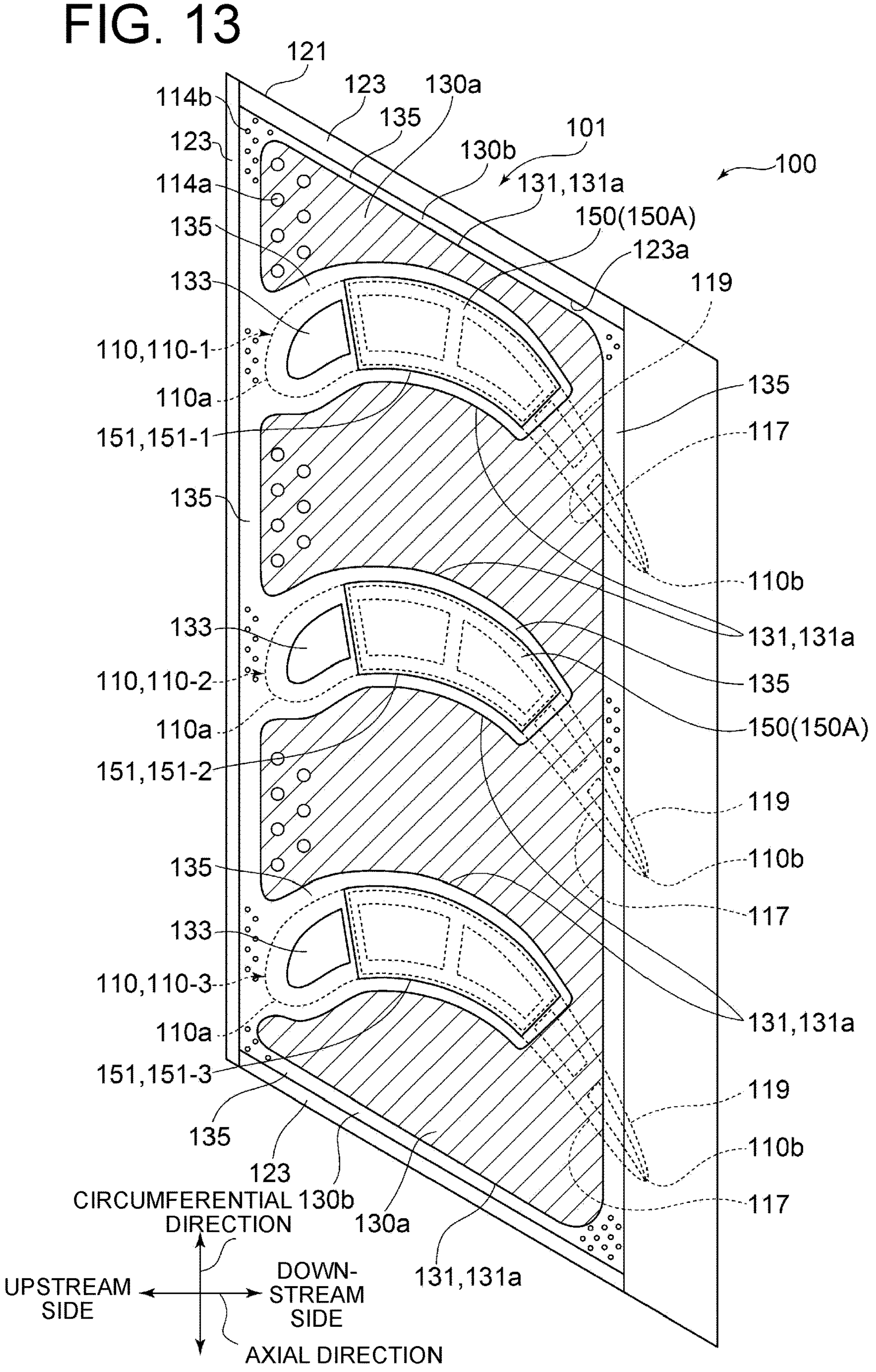
FIG. 13 is a planar view of a turbine stator vane according to another embodiment.
Figure 14:
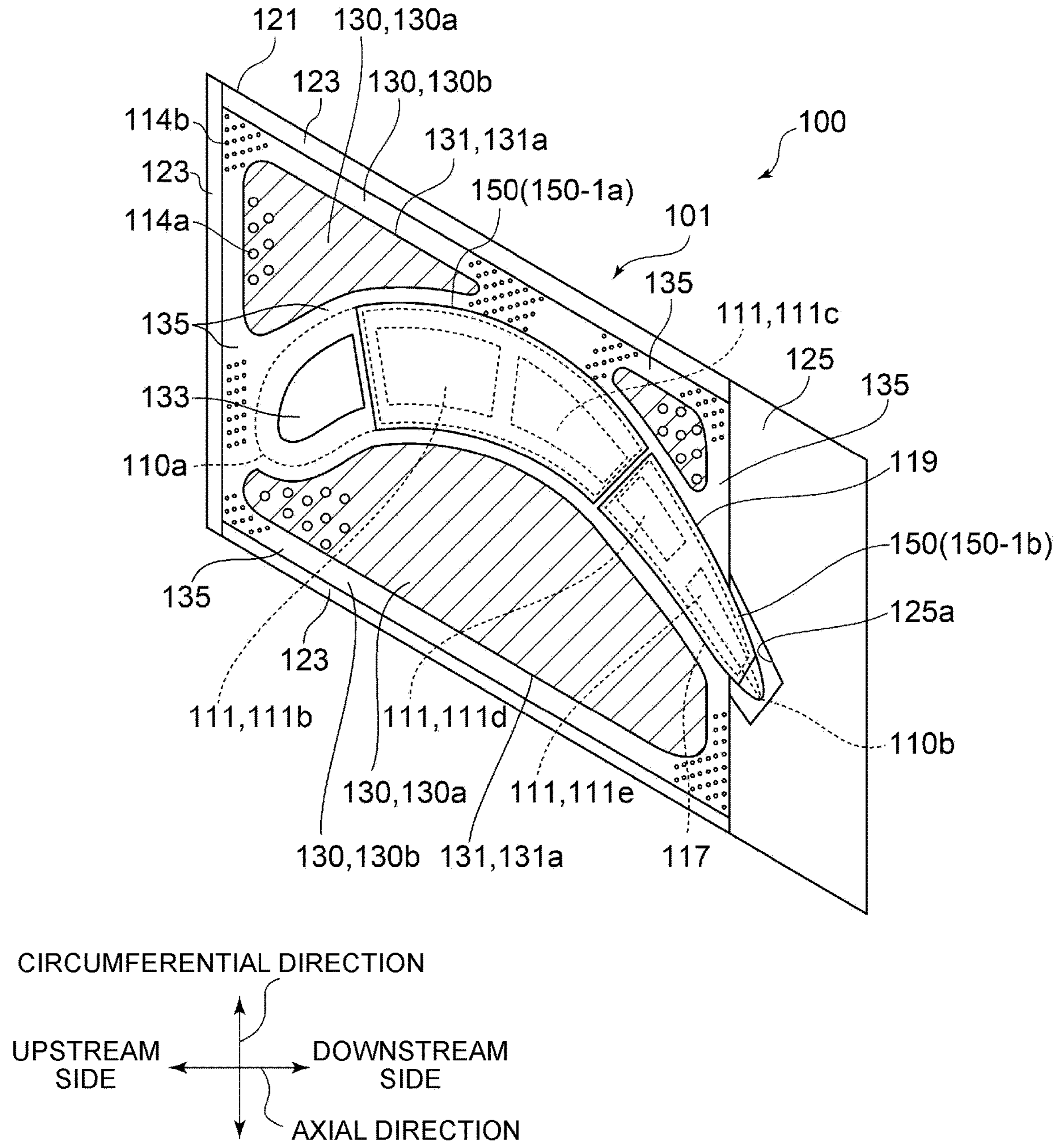
FIG. 14 is a planar view of a turbine stator vane according to another embodiment.

FIG. 9 is a planar view of a turbine stator vane according to another embodiment. FIG. 10 is an E-E arrow cross-sectional view of a turbine stator vane according to another embodiment depicted in FIG. 9. FIG. 11 is an explanatory diagram of impingement cooling of an area around a step portion of an impingement plate. FIG. 12 is a planar view of a turbine stator vane according to yet another embodiment. FIG. 13 is a planar view of a turbine stator vane according to yet another embodiment. FIG. 14 is a planar view of a turbine stator vane according to yet another embodiment.

As depicted in FIGS. 9, 10, 12, 13, and 14, the turbine stator vane 100 according to some embodiments includes an impingement plate 130 according to another embodiment formed on the outer shroud 121 and the inner shroud 122. FIGS. 9, 10, 12, 13, and 14 are planar views of the outer shroud 121 as seen inward from the outer side in the radial direction. FIG. 9 shows an example of a turbine stator vane having a single vane on a single shroud. FIG. 12 shows an example of a turbine stator vane having two vanes on a single shroud. FIG. 13 shows an example of a turbine stator vane having three vanes on a single shroud. Furthermore, in any of the aspects shown in FIGS. 9, 10, 12, and 13, a single lid portion 150 is disposed on a single airfoil portion 110. Meanwhile, FIG. 14 is an example of an embodiment where two lid portions 150 are disposed on a single air portion 110 adjacently. While the lid portion 150 is disposed on the outer shroud 121 in the example of the embodiments depicted in FIGS. 9, 10, 12, 13, and 14, the inner shroud 122 has the same structure.

In the turbine stator vane 100 according to some embodiments depicted in FIGS. 9, 10, 12, 13, and 14, the impingement plate 130 is fixed to the outer shroud 121 and the lid portion 150 so as to cover the entire surface of the inner surface 121*b* of the bottom portion 124 of the outer shroud 121 excluding the top portion 152 of the lid portion 150 disposed on the airfoil portion 110. As depicted in FIGS. 9, 10, 12, 13, and 14, the impingement plate 130 includes an upper impingement plate 130*a* (first impingement plate), a lower impingement plate 130*b* (second impingement plate) having a smaller height, in the radial direction, and having a smaller gap from the inner surface 121*b* of the bottom portion 124 of the outer shroud 121 than the upper impingement plate 130*a*, and a step portion 131 connecting the upper impingement plate 130*a* and the lower impingement plate 130*b*, and is formed integrally as a whole. The upper impingement plate 130*a* is disposed at the outer side, in the vane height direction, of the lower impingement plate 130*b*, and the gap L1 between the upper impingement plate 130*a* and the inner surface 121*b* of the outer shroud 121 is greater than the gap L2 between the lower impingement plate 130*b* and the inner surface 121*b* of the outer shroud 121 (L1>L2).

In the planar view depicted in FIGS. 9, 12, 13, and 14, the upper impingement plate 130*a* is depicted as a shaded area, and the lower impingement plate 130*b* is depicted without shading.

As depicted in FIGS. 9, 10, 12, 13, and 14, the circumferential edge portion 135 of the impingement plate 130 is fixed, by welding or the like, to a wall surface of one of the outer end portion 110*e* forming the outer peripheral surface of the opening 133 of the airfoil portion 110 of each vane, the circumferential wall portion 151 of the lid portion 150, or the inner peripheral surface 123*a* of the outer wall portion 123 of the outer shroud 121, and is sealed so as to form an impingement space 116*a*. Furthermore, also in a case where the impingement plate 130 is provided for the inner shroud 122, the impingement plate 130 is fixed by welding or the like to the airfoil portion 110, the lid portion 150, and the inner peripheral surface 123*a* of the inner shroud 122, and is sealed.

The impingement plate 130 includes the lower impingement plate 130*b* closer to the inner surface 121*b* of the outer shroud 121 in the vane height direction, and the upper impingement plate 130*a* disposed in a separating direction at the outer side in the vane height direction from the inner surface 121*b* with respect to the lower impingement plate 130*b*. The step portion 131 connecting the upper impingement plate 130*a* and the lower impingement plate 130*b* is formed so as to extend in the axial direction or the circumferential direction, between the inner peripheral surface 123*a* of the outer wall portion 123 of the outer shroud 121 and the circumferential wall portion 151 of the lid portion 150 which is disposed so as to face the inner peripheral surface 123*a* in the axial direction or the circumferential direction. The step portion 131 desirably forms an oblique portion 131*a* which is oblique with respect to the axial direction of the rotor shaft 8. Compared to forming the step portion 131 to have a surface perpendicular to the axial direction, forming the step portion 131 to have an oblique surface with some obliquity makes the press molding easier.

As depicted in FIG. 10, in the turbine stator vane 100 according to some embodiments, the outer shroud 121 is connected at the side of the tip end 110*c* of the airfoil portion 110, and the inner shroud 122 is connected at the side of the root end 110*d*. As depicted in FIG. 10, the impingement plate 130 has a region including the circumferential edge portion 135 being a fixed end formed as the lower impingement plate 130*b*, and fixed to, by welding or the like, the inner peripheral surface 123*a* of the outer wall portion 123 of the outer shroud 121 or the circumferential wall portion 151 of the lid portion 150. Furthermore, the upper impingement plate 130*a* is formed in the intermediate region of the impingement plate 130 surrounded by the lower impingement plate 130*b*. The gap (L1) between the upper impingement plate 130*a* and the inner surface 121*b* of the outer shroud 121 is greater than the gap (L2) between the lower impingement plate 130*b* and the inner surface 121*b* of the outer shroud 121.

By fixing the impingement plate 130 to the inner peripheral surface 123*a* of the outer wall portion 123 of the outer shroud 121 and the circumferential wall portion 151 of the lid portion 150, the impingement space 116*a* formed between the impingement plate 130 and the inner surface 121*b* of the outer shroud 121 is closed from the internal space 116 formed at the outer side, in the radial direction, of the outer shroud 121. The internal space 116 and the impingement space 116*a* are in communication via through holes 114 (described below).

In a case where the impingement plate 130 having a flat plate shape is applied without providing any step, thermal stress may occur at the impingement plate 130, and the impingement plate 130 may get damaged in the end. That is, in a case where the impingement plate 130 is disposed at the outer shroud 121, the impingement plate 130 is in external contact with the internal space 116 at the outer side in the radial direction, and in internal contact with the impingement space 116*a* at the inner side in the radial direction. Thus, during normal operation of the gas turbine 1, the metal temperature of the impingement plate 130 is closer to the temperature of the cooling medium, and is maintained at relatively low temperature. On the other hand, the outer wall portion 123 of the outer shroud 121 and the lid portion 150 to which the impingement plate 130 is fixed has a high metal temperature from the influence of the combustion gas temperature. Thus, during a temperature increase like start up or the like of the gas turbine 1, as the combustion gas temperature increases, the metal temperature increases at the airfoil portion 110, the outer shroud 121 and the inner shroud 122, and the lid portion 150, which make direct contact with the combustion gas flow. On the other hand, the impingement plate 130 is disposed in the flow of the cooling medium, and thus maintained at relatively low temperature.

Thus, as the combustion gas temperature increases, although the bottom portion 124 of the outer shroud 121 and the outer wall portion 123 of the outer shroud 121 start thermal expansion in the axial direction and the circumferential direction, the thermal expansion of the impingement plate 130 in the axial direction and the circumferential direction is limited due to the low metal temperature. Thus, in a state where the entire circumference of the circumferential edge portion 135 of the impingement plate 130 is fixed to, by welding or the like, one of the inner peripheral surface 123*a* of the outer wall portion 123 of the outer shroud 121 or the circumferential wall portion 151 of the lid portion 150, thermal stress due to thermal expansion difference occurs in the vicinity of the joint position between the circumferential edge portion 135 of the impingement plate 130 and the outer wall portion 123 of the outer shroud 121 and the circumferential wall portion 151 of the lid portion 150. The impingement plate 130 is formed of a relatively thin plate compared to the outer wall portion 123 of the outer shroud 121, but thermal stress still occurs and may damage the impingement plate 130.

To suppress occurrence of such thermal stress, it is desirable to provide at least one step portion for opposite end portions at which the impingement plate 130 is fixed, that is, for instance, between the inner peripheral surface 123*a* of the outer wall portion 123 of the outer shroud 121 and the circumferential wall portion 151 of the lid portion 150 disposed so as to face the inner peripheral surface 123*a* in the axial direction or the circumferential direction. In an embodiment of the stator vane where a single shroud has a plurality of vanes as in the embodiments depicted in FIGS. 12 and 13, it is desirable to provide at least one step portion 131 for the impingement plate 130, between the circumferential wall portion 151 of the lid portion 150 of one of two vanes which are disposed adjacent to one another in the circumferential direction, and the circumferential wall portion 151 of the lid portion 150 of the other vane of the two adjacent vanes.

For instance, in the embodiment depicted in FIG. 12, a first airfoil portion 110-1 and a second airfoil portion 110-2 exist between a single outer shroud 121 and a single inner shroud 122 (not depicted in FIG. 12). The lid portion 150 is mounted to each of the first airfoil portion 110-1 and the second airfoil portion 110-2 positioned adjacent to one another along the circumferential direction.

The impingement plate 130 is disposed between: the circumferential wall portion 151-1 that faces the lid portion 150 disposed on the second airfoil portion 110-2, of the circumferential wall portion 151-1 of the lid portion 150 disposed on the first airfoil portion 110-1; and the circumferential wall portion 151-2 that faces the lid portion 150 disposed on the first airfoil portion 110-1, of the circumferential wall portion 151-2 of the lid portion 150 disposed on the second airfoil portion 110-2.

Similarly, in the embodiment depicted in FIG. 13, a first airfoil portion 110-1, a second airfoil portion 110-2, and a third airfoil portion 110-3 exist between a single outer shroud 121 and an inner shroud 122 (not depicted in FIG. 13). The lid portion 150 is mounted to each of the first airfoil portion 110-1, the second airfoil portion 110-2, and the third airfoil portion 110-3 positioned adjacent to one another along the circumferential direction.

The impingement plate 130 is disposed between: the circumferential wall portion 151-1 that faces the lid portion 150 disposed on the second airfoil portion 110-2, of the circumferential wall portion 151-1 of the lid portion 150 disposed on the first airfoil portion 110-1; and the circumferential wall portion 151-2 that faces the lid portion 150 disposed on the first airfoil portion 110-1, of the circumferential wall portion 151-2 of the lid portion 150 disposed on the second airfoil portion 110-2. Similarly, the impingement plate 130 is disposed between: the circumferential wall portion 151-2 that faces the lid portion 150 disposed on the third airfoil portion 110-3, of the circumferential wall portion 151-2 of the lid portion 150 disposed on the second airfoil portion 110-2; and the circumferential wall portion 151-3 that faces the lid portion 150 disposed on the second airfoil portion 110-2, of the circumferential wall portion 151-3 of the lid portion 150 disposed on the third airfoil portion 110-3.

With the above configuration, the outer shroud 121 and the inner shroud 122 have the outer wall portion 123 formed on each end, in the axial direction and the circumferential direction, of the shrouds 121, 122, and the impingement plate 130 having a plurality of through holes 114 is formed integrally between the outer wall portion 123 and the lid portion 150 so as to cover the bottom portion 124 of the outer shroud 121 and the inner shroud 122. The impingement plate 130 includes the lower impingement plate 130*b* and the upper impingement plate 130*a* formed integrally via the step portion 131, and thus it is possible to suppress thermal stress that occurs on the impingement plate 130.

With the above configuration, the step portion 131 is formed on the impingement plate 130 between the lid portions 150 fixed to the plurality of airfoil portions 110 arranged in the circumferential direction on the outer shroud 121 or the inner shroud 122, and thus it is possible to suppress thermal stress that occurs on the impingement plate 130 disposed between the airfoil portions 110.

With the above configuration, the step portion 131 has the oblique portion 131*a* that has obliquity with respect to the axial direction of the rotor shaft 8, and thus processing is facilitated.

As depicted in FIGS. 9, 10, 12, 13, and 14, in the turbine stator vane 100 according to some embodiments, it is desirable to form the step portion 131 on the impingement plate 130 continuously, such that a closed step loop of the step portion 131 is formed along the fixation points between the impingement plate 130 and the outer wall portion 123 of the outer shroud 121 and the circumferential wall portion 151 of the lid portion 150. It is desirable to avoid discontinuity of the step portion 131 as much as possible, because thermal stress is likely to occur in an area with such discontinuity.

In the embodiment depicted in FIG. 9, the side of the suction-side vane surface 119 of the outer shroud 121 has a smaller gap between the outer wall portion 123 of the suction-side vane surface 119 and the inner peripheral surface 123*a* compared to the side of the pressure-side vane surface 117, and thus it is difficult to provide the step portion 131 in the gap. In a case of a vane having the above structure, it is desirable to form a plurality of step loops of the step portion 131 on a single shroud. In a case where the gap between the suction-side vane surface 119 and the inner peripheral surface 123*a* of the outer wall portion 123 is large and there is room for providing the step portion 131, it is desirable to merge the plurality of step loops of the step portion 131, and provide a single step loop of the step portion 131.

As depicted in FIGS. 10 and 11, a plurality of through holes 114 are formed on the entire surface of the upper impingement plate 130*a* and the entire surface of the lower impingement plate 130*b*. The upper through holes 114*a* (first through holes) formed on the upper impingement plate 130*a* have a greater hole diameter 'd' than the lower through holes 114*b* (second through holes) formed on the lower impingement plate 130*b*. Furthermore, the arrangement pitch P1 of the upper through holes 114*a* is positioned in a larger pitch than the arrangement pitch P2 of the lower through holes 114*b*. Furthermore, the through holes 114 may be disposed on the oblique portion 131*a* forming the step portion 131. Furthermore, the arrangement of the through holes 114 may be a square arrangement, or a staggered arrangement.

With reference to FIG. 11, described below is a difference, between the upper impingement plate 130*a* and the lower impingement plate 130*b*, in the through holes 114 (114*a*, 11*b*) and the effect of impingement cooling on the inner surface 121*b* of the bottom portion 124 of the outer shroud 121. As depicted in FIG. 11, the cooling medium supplied to the internal space 116 from outside is injected via the through holes 114 formed on the impingement plate 130, inwardly from the outer side in the radial direction. When the cooling medium is injected, the difference in pressures acting on the front and back of the impingement plate 130 causes the cooling medium to become an injection flow and impinge on the inner surface 121*b* of the bottom portion 124 of the outer shroud 121, thereby performing impingement cooling on the inner surface 121*b*.

However, when the gap L is too large with respect to the flow velocity at the time when the cooling medium passes through the through holes 114, the injection flow of the cooling medium may dissipate at the intermediate position before reaching the inner surface 121*b*. In this case, when the cooling medium reaches the inner surface 121*b*, it may not be possible to obtain a predetermined flow velocity nor a sufficient heat transfer coefficient between the cooling medium and the inner surface 121*b*, at the positions Q1, Q2 on the inner surface 121*b* directly below the through holes 114. With regard to the front-back pressure difference of the impingement plate 130 at the time when the cooling medium passes through the through holes 114, there is an appropriate ratio (d/L) between the diameter of the through holes 114 and the gap L, for obtaining a sufficient heat transfer coefficient on the inner surface 121*b*. Thus, when the gap L of the impingement plate 130 is different, it is desirable to select a corresponding hole diameter to maintain the appropriate ratio (d/L) between the diameter of the through holes and the gap L. That is, when d1 is the hole diameter of the upper through holes 114*a* formed on the upper impingement plate 130*a*, L1 is the gap of the upper impingement plate 130*a*, d2 is the diameter of the lower through holes 114*b* formed on the lower impingement plate 130*b*, and L2 is the gap of the lower impingement plate 130*b*, it is desirable for the upper through holes 114*a* and the lower through holes 114*b* to have relationships d1>d2 and L1>L2, and select an appropriate ratio (d/L) between the diameter 'd' of the through holes and the gap L.

With the above configuration, the diameter of the upper through holes 114*a* formed on the upper impingement plate 130*a* is formed to be greater than the diameter of the lower through holes 114*b* formed on the lower impingement plate 130*b*, and thus it is possible to cool the inner surface 121*b* of the shroud effectively with the cooling medium.

Furthermore, among the diameter d1 and the arrangement pitch p1 of the upper through holes 114*a*, and the hole diameter d2 and the arrangement pitch p2 of the lower through holes 114*b*, when d1>d2, it is desirable to select an arrangement pitch of p1>p2. This is because, if a small pitch like the arrangement pitch p2 of the lower through holes 114*b* is selected as an arrangement pitch of the upper through holes 114*a*, the injection amount of the cooling medium increases, and excessive consumption of the cooling medium leads to deterioration in the heat efficiency of the gas turbine 1.

With the above configuration, the pitch p1 of the upper through holes 114*a* formed on the upper impingement plate 130*a* is formed to be greater than the pitch p2 of the lower through holes 114*b* formed on the lower impingement plate 130*b*, and thus it is possible to cool the inner surface 121*b* of the bottom portion 124 of the shroud effectively with the cooling medium and suppress excessive consumption of the cooling medium.

FIG. 14 is a planar view of a turbine stator vane according to yet another embodiment. That is, FIG. 14 is a planar view of a turbine stator vane according to another embodiment, where a plurality of lid portions 150 (150-1*a*, 150-1*b*) are disposed on the vane body 101 adjacently in the flow direction of the cooling medium flowing through the cooling flow passage 111, so as to correspond to the embodiments depicted in FIGS. 4 and 5. The lid portion 150-1*a* forms a turn-back flow passage 112*b* which brings the cooling flow passage 111*b* and the cooling flow passage 111*c* into communication, and the lid portion 150-1*b* forms the turn-back flow passage 112*d* which brings the cooling flow passage 111*d* and the cooling flow passage 111*e* into communication. Furthermore, the lid portion 150-1*b* overlaps partially with the trailing edge end portion 125, and thus the region surrounding the lid portion 150-1*b* has a cut-out portion 125*a* formed on the trailing edge end portion 125 in order to mount and dismount the lid portion 150-1*b* easily. In the present embodiment, similarly in the embodiment depicted in FIGS. 9, 10, 12, and 13, the impingement plate 130 is disposed on the shroud (outer shroud 121, inner shroud 122), and the step portion 131 is formed on the impingement plate 130, thereby dividing the impingement plate 130 into the upper impingement plate 130*a* and the lower impingement plate 130*b*. It is desirable that the through holes 114 including the upper through holes 114*a* and the lower through holes 114*b* are formed over the entire surface of the upper impingement plate 130*a* and the entire surface of the lower impingement plate 130*b*, and an appropriate through hole configuration (hole diameter, pitch, etc.) is selected in accordance with the size of the gap L between the impingement plate 130 and the inner surface 121*b* of the outer shroud 121.

In the respective embodiments depicted in FIGS. 9, 12, 13, and 14, the through holes 114 (upper through holes 114*a*, lower through holes 114*b*) are disposed over the entire surfaces of the upper impingement plate 130*a* and the lower impingement plate 130*b* (only a part of the through hole 114 is depicted in FIGS. 9, 12, 13, and 14).

Figure 15:
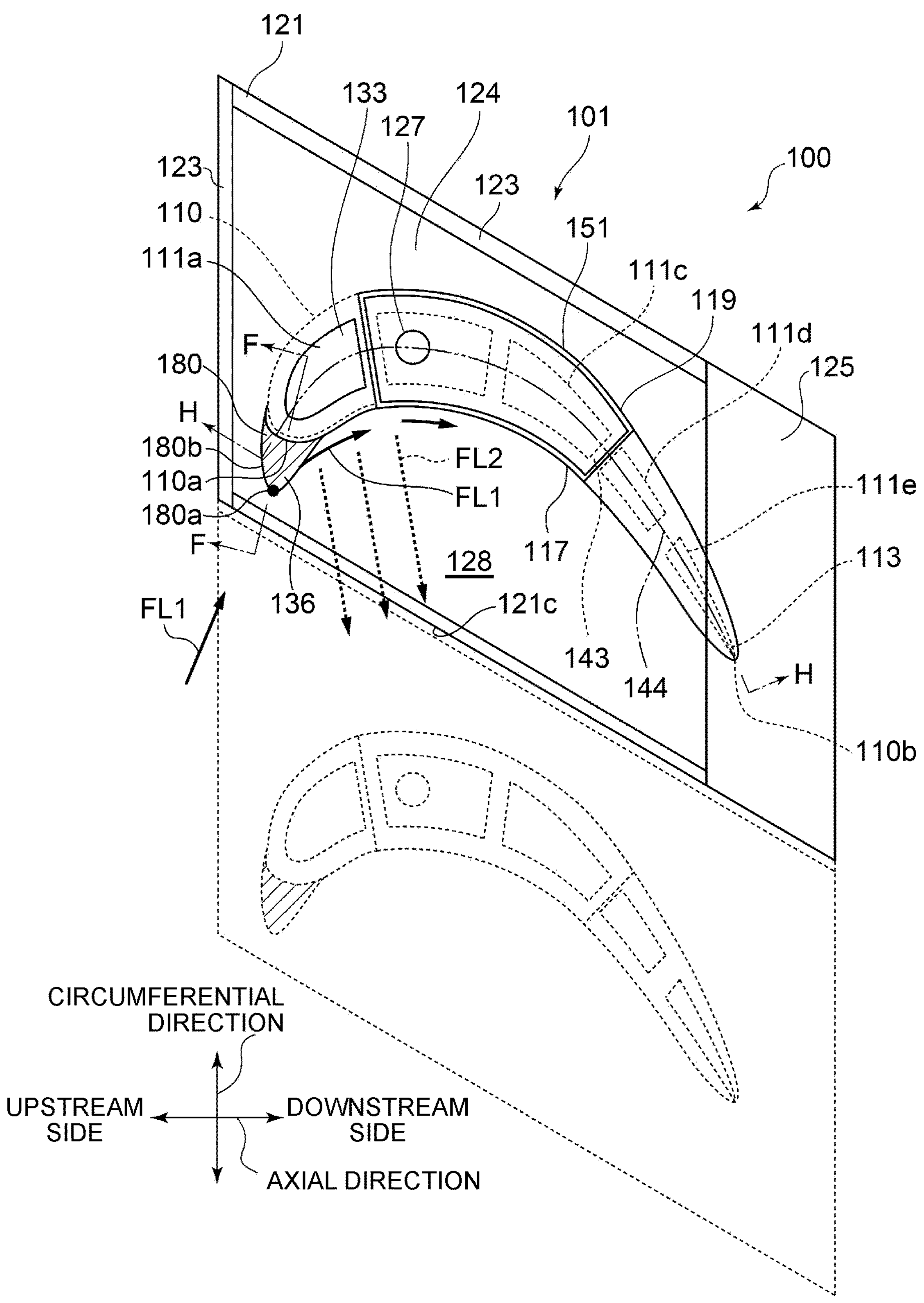
FIG. 15 is a planar view of a turbine stator vane according to another embodiment.
Figure 16:
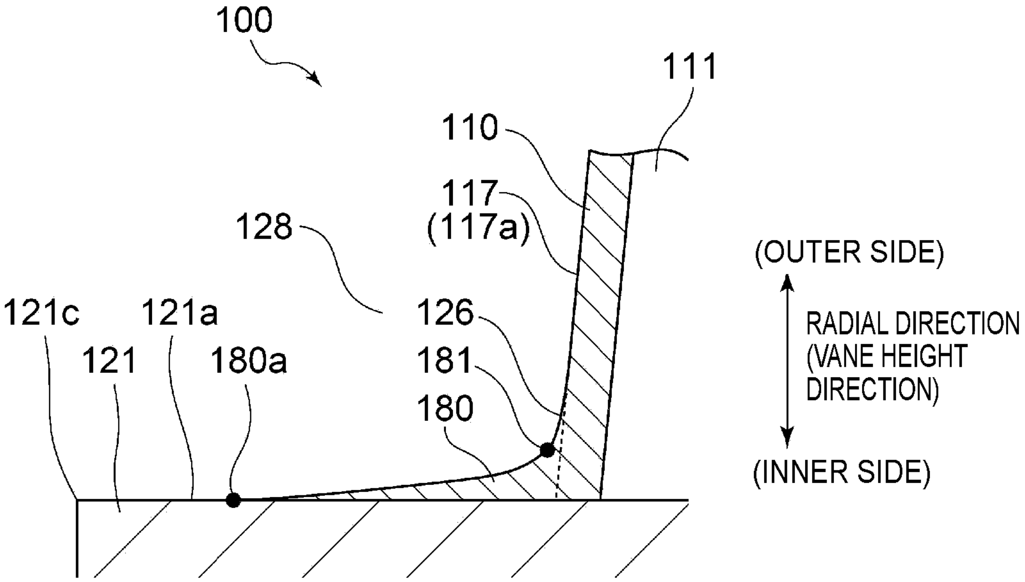
FIG. 16 is an F-F arrow cross-sectional view of a turbine stator vane according to another embodiment depicted in FIG. 15.
Figure 17:
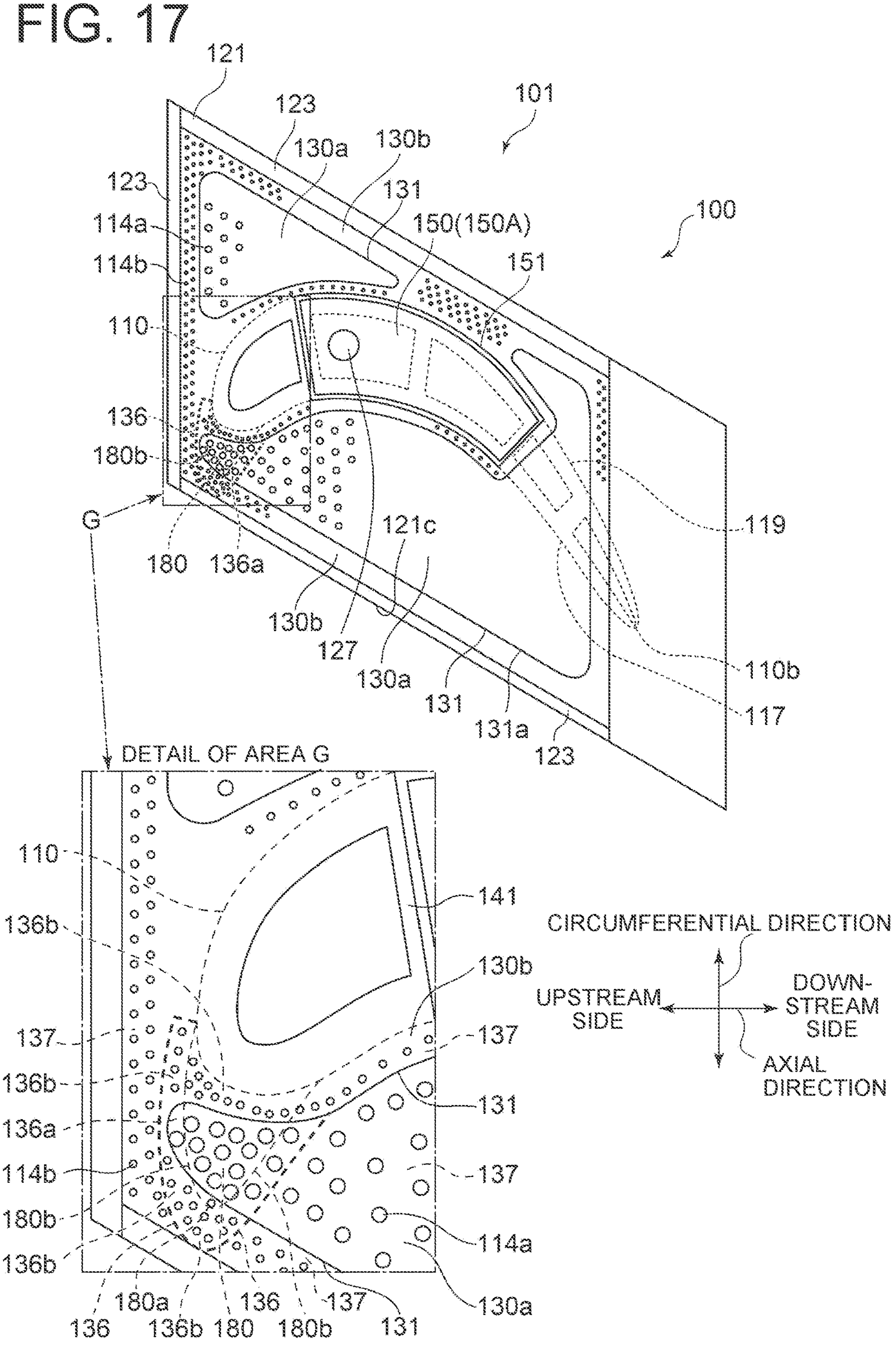
FIG. 17 is a planar view of a turbine stator vane according to another embodiment.
Figure 18:
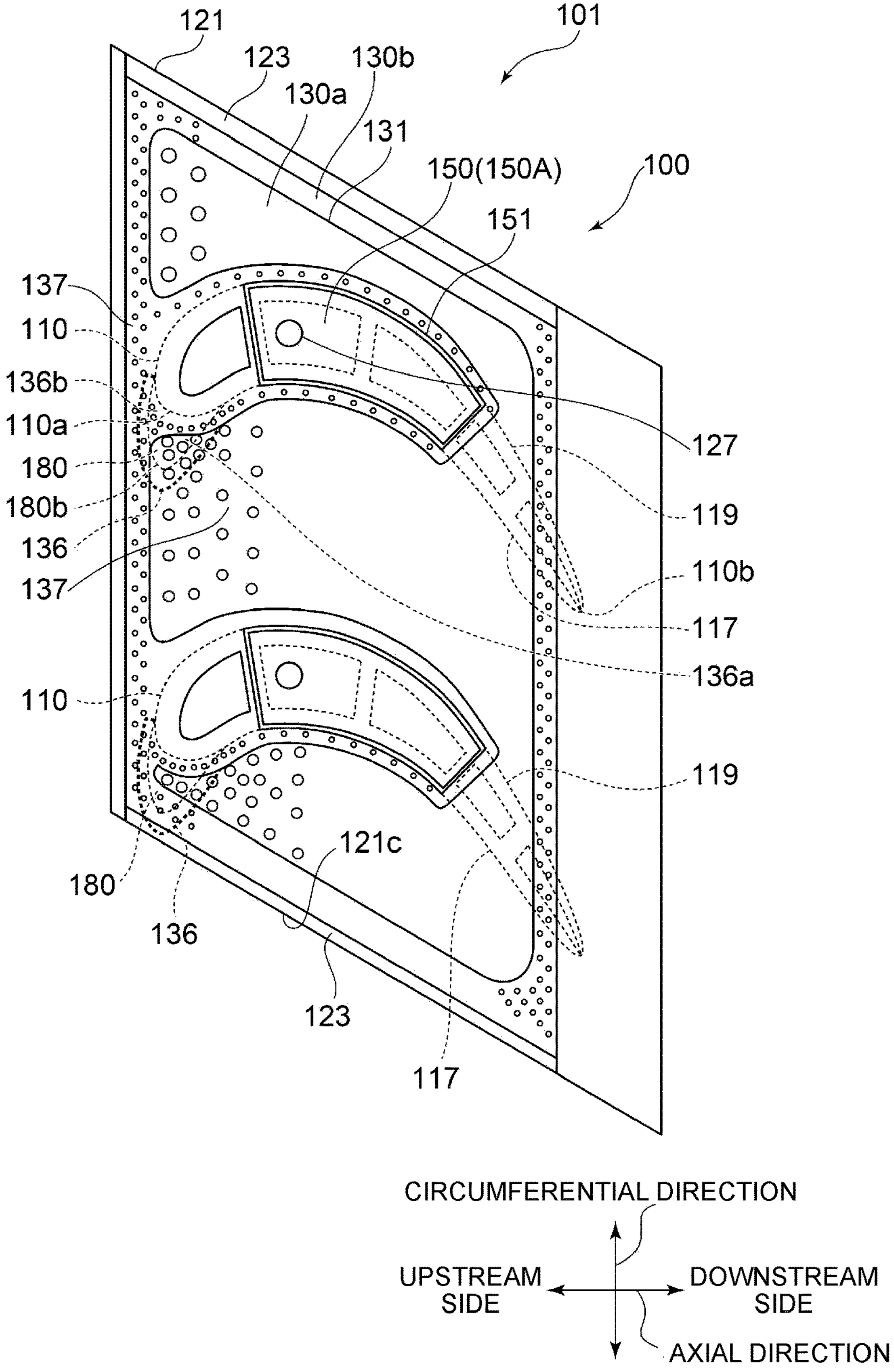
FIG. 18 is a planar view of a turbine stator vane according to another embodiment.
Figure 19:
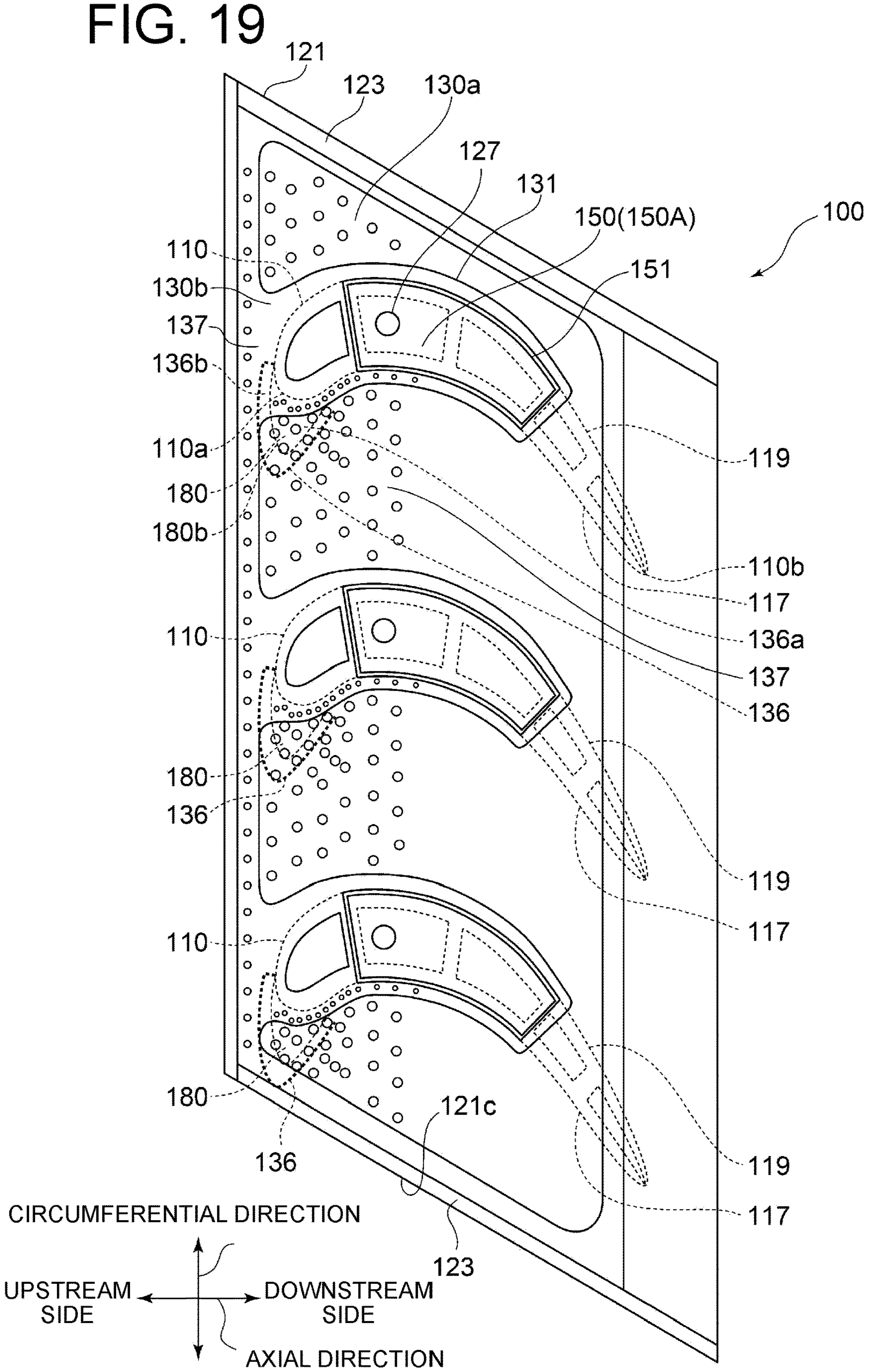
FIG. 19 is a planar view of a turbine stator vane according to another embodiment.
Figure 20:
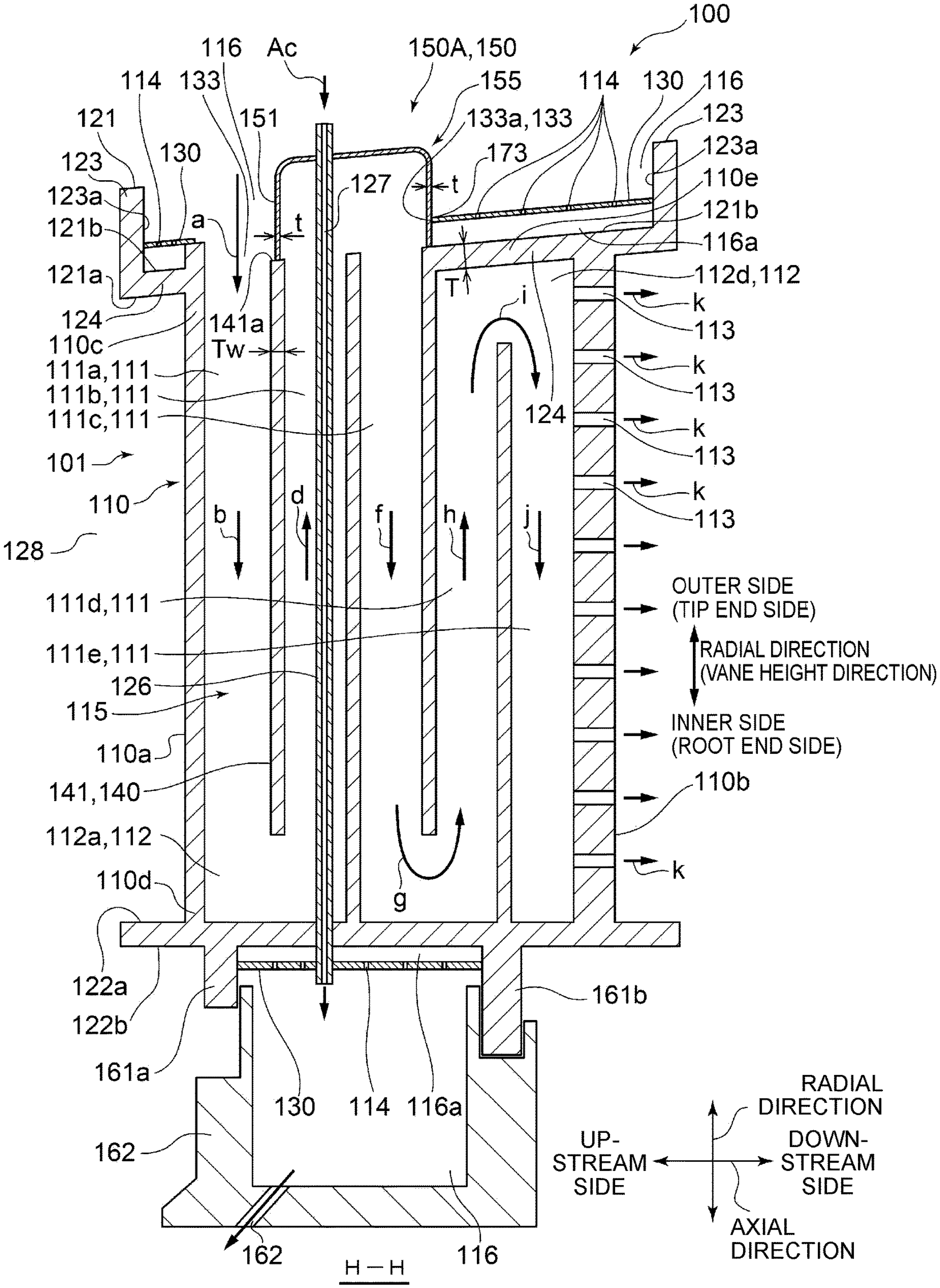
FIG. 20 is an internal cross-sectional view of a turbine stator vane according to another embodiment (H-H arrow view in FIG. 15)

FIG. 15 is a planar view of a turbine stator vane according to another embodiment. FIG. 16 is a partial cross-sectional view of the shroud depicted in FIG. 15. FIGS. 17 to 19 are each a planar view of a turbine stator vane according to another embodiment. FIG. 20 is an internal cross-sectional view of a turbine stator vane according to another embodiment.

The present embodiment relates to a cooling structure in which a protruding portion is disposed partially on the outer surface of the shroud and the protruding portion is cooled, to suppress the secondary flow that occurs on the gas path surface of the shroud.

As depicted in FIG. 15, in a case of a vane whose airfoil portion 110 receives a high load, at the inlet flow passage portion of the combustion gas flow passage 128, a secondary flow FL2 may occur, which flows in a substantially orthogonal direction to the combustion gas flow FL1 being the main flow. When the secondary flow FL2 of combustion gas occurs, the pressure loss of the combustion gas flow FL1 flowing through the combustion gas flow passage 128 between the vanes increases, and the aerodynamic performance deteriorates. That is, the combustion gas flow FL1 flowing into the turbine stator vane 100 flows into the combustion gas flow passage 128 with an obliquity with respect to the axial direction. In a case where a vane receives a high load, thermal expansion of the combustion gas fluid flowing into the vane increases the difference between the maximum pressure and the minimum pressure applied to the airfoil portion 110 on the pressure-side vane surface 117 with a high pressure and the suction-side vane surface 118 with a low pressure, which increases the load applied to the vane.

In a case where a vane receives a high load, the secondary flow FL2 is likely to occur, and the secondary flow FL2 depicted in dotted line in FIG. 15 is generated from the side of the pressure-side vane surface 117 being a pressure surface side toward the suction-side vane surface 118 at the suction surface side of the airfoil portion 110 of the adjacent vane body 101. The generation of the secondary flow FL2 increases pressure loss of the combustion gas flow FL1. To suppress generation of the secondary flow FL2, a secondary-flow suppressing unit for suppressing the secondary flow FL2 is disposed in the vicinity of the leading edge portion 117*a* of the pressure-side vane surface 117 at the side of the leading edge 110*a* of the vane body 101 where the combustion gas flow FL1 flows into the vane body 101.

As depicted in FIGS. 15 and 16, specifically, the airfoil portion 110 and the shroud 120 (outer shroud 121, inner shroud 122) are connected via a fillet 126 formed over the entire circumference of the airfoil portion 110. On the outer surface 121*a* of the shroud 120, a vane-surface protruding portion 180 is formed so as to extend to the intermediate position of the flow passage width of the combustion gas flow passage 128 between the airfoil portion 110 and the shroud end portion 121*c*. The vane-surface protruding portion 180 has a connection portion 181 which connects the fillet 126 formed on the airfoil portion 110 and the outer surface 121*a* of the shroud 120. The vane-surface protruding portion 180 extends from the connection portion 181 in a direction in which the combustion gas FL flows in, to the tip end portion 180*a*. The vane-surface protruding portion 180 has a mountain-like convex shape which protrudes toward the side of the combustion gas flow passage 128 in the vane height direction from the outer surface 121*a* of the shroud 120. The vane-surface protruding portion 180 is disposed so as to form an oblique surface having the highest height from the outer surface 121*a* at the connection portion 181 to the fillet 126, and the height gradually decreases toward the leading edge 110*a* and the trailing edge. Furthermore, the boundary at which the vane-surface protruding portion 180 connects to the outer surface 121*a* of the shroud 120 forms the outer edge portion 180*b* of the vane-surface protruding portion 180.

The detail of the structure around the vane-surface protruding portion 180 is depicted specifically in the enlarged view of area G in FIG. 17. As depicted in the enlarged view of area G, the upper impingement plate 130*a* is disposed between the airfoil portion 110 and the outer wall portion 123 disposed at the side of the pressure-side vane surface 117 in the circumferential direction, and the lower impingement plate 130*b* is disposed between the upper impingement plate 130*a* and the airfoil portion 110, and between the upper impingement plate 130*a* and the outer wall portion 123 at the side of the pressure-side vane surface 117. Furthermore, there is region where, a region where the upper impingement plate 130*a* and the lower impingement plate 130*b* are disposed and a region including the outer edge portion 180*b* of the vane-surface protruding portion 180 formed on the outer surface 121*a* of the shroud 120 overlap in the vane height direction.

Herein, the leading edge portion 117*a* of the pressure-side vane surface 117 where the vane-surface protruding portion 180 is disposed, as described above, is a range where the connection portion 181 is formed, which is the boundary to the fillet 126 and which forms the vane-surface protruding portion 180 with the tip end portion 180*a* and the outer edge portion 180*b*, and a range which includes at least the leading edge 110*a* and extends from the leading edge 110*a* to the first partition wall 141 that forms a part of the cooling flow passage 111 of the airfoil portion 110 along the pressure-side vane surface 117. Depending on the angle at which the combustion gas flow FL1 flows into the pressure-side vane surface 117, the leading edge portion 117*a* may be positioned closer to the suction-side vane surface 119 than the position of the leading edge 110*a*.

As described above, by providing the vane-surface protruding portion 180 that protrudes in the vane height direction, the combustion gas flow FL1 flowing into the vane body 101 makes the first contact with the pressure-side vane surface 117 of the leading edge 110*a* of the airfoil portion 110 at a position where the vane-surface protruding portion 180 is disposed, that is, where the distance between the tip end 110*c* and the root end 110*d* of the shroud 120 in the vane height direction is shorter than that in the region where the vane-surface protruding portion 180 is not formed. In other words, at the vane-surface protruding portion 180, the flow passage length in the vane height direction is shorter, and the flow-passage area is smaller. As a result, as indicated by the arrow in FIG. 15, the flow velocity of the combustion gas flow FL1 being the main flow that flows over the vane-surface protruding portion 180 and along the pressure-side vane surface 117 increases.

As described above, when the difference increases between the maximum pressure and the minimum pressure of the pressure-side vane surface 117 of the airfoil portion 110 being a pressure surface and the suction-side vane surface 119 of the airfoil portion 110 being a suction surface, the secondary flow FL2 is generated from the pressure-side vane surface 117 of the airfoil portion 110 toward the suction-side vane surface 119 of the adjacent airfoil portion 110. However, with the vane-surface protruding portion 180 provided at a position of the pressure-side vane surface 117 of the leading edge 110*a* of the airfoil portion 110 into which the combustion gas flow FL1 flows, the flow velocity of the combustion gas flow FL1 flowing along the pressure-side vane surface 117 of the airfoil portion 110 increases, which has an effect to reduce the secondary flow FL2. As a result, the pressure loss of the combustion gas flow FL1 flowing through the combustion gas flow passage 128 due to generation of the secondary flow is reduced, and the aerodynamic performance improves.

On the other hand, the outer surface 121*a* of the shroud 120 may have a non-cooling structure or a vane structure that cools only the region along the end portion 121*c* of the shroud 120. In this case, the vane-surface protruding portion 180 and the shroud 120 around the outer edge portion 180*b* of the vane-surface protruding portion 180 may have higher thermal stress than the other region of the shroud 120, and the thermal stress may exceed a tolerance.

To solve the above problem, in the present embodiment, as described above, the cooling structure depicted in FIGS. 17 to 20 is applied. That is, in some embodiments, as depicted in FIGS. 9 to 14, the shroud 120 has the impingement plate 130 having the plurality of through holes 114 disposed therein, so as to perform impingement cooling on the inner surface 121*b* opposite to, in the vane height direction, the outer surface (gas path surface) 121*a* of the bottom portion 124 of the shroud 120. In the present embodiment, as depicted in FIG. 17, to enhance cooling of the vane-surface protruding portion 180 and the outer surface 121*a* of the shroud 120 around the outer edge portion 180*b* of the vane-surface protruding portion 180, a structure is applied to increase the opening density of the through holes 114 of the impingement plate 130.

That is, as depicted in FIG. 17, in the present embodiment, to enhance impingement cooling on the inner surface 121*b* opposite to the outer surface 121*a* on which the vane-surface protruding portion 180 is formed so as to cover the outer edge portion 180*b* of the vane-surface protruding portion 180 formed on the outer surface 121*a* of the shroud 120 and indicated by a thin dotted line, the impingement plate 130 has a high-density region 136 (first high-density region 136*a*, second high-density region 136*b*) having a high opening density of the through holes 114 indicated by a thick dotted line. That is, the impingement plate 130 (upper impingement plate 130*a*, lower impingement plate 130*b*) is configured such that, as depicted in FIG. 11, in the general region 137 where the vane-surface protruding portion 180 is not formed, the upper impingement plate 130*a* has a plurality of upper through holes 114*a* with the hole diameter d1 and the arrangement pitch p1, and the lower impingement plate 130*b* has a plurality of lower through holes 114*b* with the hole diameter d2 and the arrangement pitch p2. On the other hand, as the high-density region 136 where the vane-surface protruding portion 180 is formed, the upper impingement plate 130*a* has a first high-density region 136*a* having a plurality of upper through hole 114*a* having the same diameter d1 but having an arrangement pitch p13 whose hole interval is smaller than the arrangement pitch p1, and the lower impingement plate 130*b* has a second high-density region 136*b* having a plurality of lower through holes 114*b* having the same hole diameter d2 but having an arrangement pitch p14 whose hole interval is smaller than the arrangement pitch p2. By providing the high-density region 136 (first high-density region 136*a*, second high-density region 136*b*) where the opening density of the through hole 114 is increased compared to that in the general region 137, it is possible to enhance cooling of a range of the outer surface 121*a* of the shroud 120 which includes the outer edge portion 180*b* of the vane-surface protruding portion 180.

Herein, the opening density of the through holes 114 is represented by [d/P], where 'd' is the diameter of the through holes 114 and P is the arrangement pitch of the through holes 114 depicted in FIG. 11. When the hole diameter 'd' is constant and the arrangement pitch P is increased, the opening density decreases. When the hole diameter 'd' is constant and the arrangement pitch P is reduced, the opening density increases, and the impingement cooling on the bottom portion 124 is enhanced. Similarly, when the arrangement pitch P is constant and the hole diameter 'd' is increased, the opening density increases. When the arrangement pitch P is constant and the hole diameter 'd' is reduced, the opening density decreases. In the case of the upper impingement plate 130*a*, in the first high-density region 136*a* where the upper through holes 114*a* are arranged with the hole diameter d1 and the arrangement pitch p13 depicted in FIG. 11, impingement cooling performance is enhanced compared to the region of the outer surface 121*a* of the shroud 120 where the vane-surface protruding portion 180 is not formed. Similarly, in the case of the lower impingement plate 130*b*, in the second high-density region 136*b* where the lower through holes 114*b* are arranged with the hole diameter d2 and the arrangement pitch p14 depicted in FIG. 11, impingement cooling performance is enhanced compared to the region of the lower impingement plate 130*b* where the vane-surface protruding portion 180 is not formed.

As described above, on the outer edge portion 180*b* on which the vane-surface protruding portion 180 is formed and the impingement plate 130 around the outer edge portion 180*b*, including the vane-surface protruding portion 180, through holes 114 forming the high-density region 136 (first high-density region 136*a*, second high-density region 136*b*) are disposed in the range indicated by the thick dotted line. When the outer edge portion 180*b* forming the vane-surface protruding portion 180 is seen in the vane height direction, at least the high-density region 136 (first high-density region 136*a*, second high-density region 136*b*) is overlapped so as to envelop the outer edge portion 180*b* of the vane-surface protruding portion 180 entirely, and cover the outer edge portion 180*b*.

Specifically, as depicted in FIG. 17, the region where the outer edge portion 180*b* of the vane-surface protruding portion 180 is disposed extends, as seen in the vane height direction, to both of the lower impingement plate 130*b* fixed to the airfoil portion 110 or the lid portion 150, and the upper impingement plate 130*a* connected via the step portion 131. Thus, for the lower impingement plate 130*b*, in the region that overlaps with the range surrounded by the outer edge portion 180*b* of the vane-surface protruding portion 180, as indicated by the thick dotted line, a second high-density region 136*b* is formed, which has a higher opening density than the general region 137 of the lower impingement plate 130*b* (lower through holes 114*b* with the hole diameter d2 and the arrangement pitch p2). Furthermore, for the upper impingement plate 130*a*, in the region that overlaps with the range surrounded by the outer edge portion 180*b* of the vane-surface protruding portion 180, a first high-density region 136*a* (upper through holes 114*a* with the hole diameter d1 and the arrangement pitch p13) is formed, which has a higher opening density than the general region 137 of the upper impingement plate 130*a* (upper through holes 114*a* with the hole diameter d1 and the arrangement pitch p1).

With the above configuration, it is possible to form the high-density region 136 (first high-density region 136*a*, second high-density region 136*b*) having a higher opening density of the through holes 114 on the impingement plate 130, so as to cover the outer edge portion 180*b* of the vane-surface protruding portion 180. As a result, impingement cooling is performed on the inner surface 121*b* of the shroud 120 overlapping with the high-density region 136 that includes a range where the outer edge portion 180*b* of the vane-surface protruding portion 180 is formed, and thereby the thermal stress on the shroud 120 around the vane-surface protruding portion 180 is reduced.

FIG. 18 is a planar view of the turbine stator vane according to another embodiment, where the vane-surface protruding portion 180 is provided to suppress the secondary flow FL2 of the combustion gas flow FL1. Also in the present embodiment, similarly to the embodiment depicted in FIG. 17, the vane-surface protruding portion 180 is formed on the outer surface 121*a* of the shroud 120, more specifically, on the pressure-side vane surface 117 at the side of the leading edge 110*a*. As depicted in FIGS. 15, 16, and 18, the vane-surface protruding portion 180 connects to the fillet 126 formed on the airfoil portion 110 via the connection portion 181, and extends from the connection portion 181 in a direction in which the combustion gas FL flows in, to the tip end portion 180*a*. The vane-surface protruding portion 180 has a mountain-like convex shape which protrudes toward the side of the combustion gas flow passage 128 in the vane height direction from the outer surface 121*a* of the shroud 120. The vane-surface protruding portion 180 is disposed so as to form an oblique surface having the highest height from the outer surface 121*a* at the connection portion 181 to the fillet 126, and the height gradually decreases toward the leading edge 110*a* and the trailing edge 110*b*. Furthermore, the boundary at which the vane-surface protruding portion 180 connects to the outer surface 121*a* of the shroud 120 forms the outer edge portion 180*b* of the vane-surface protruding portion 180.

Meanwhile, in a case of the turbine stator vane 100 depicted in FIG. 18 where a single shroud has two vanes, in the vane structure, the pressure-side vane surface 117 may face the suction-side vane surface 119 of the adjacent airfoil portion 110, and may not directly face the outer wall portion 123. With such airfoil portions 110, the secondary flow similar to that described above may occur between adjacent airfoil portions 110. Thus, to reduce the secondary flow, similarly, the vane-surface protruding portion 180 is formed from the leading edge portion 117*a* of the pressure-side vane surface 117 of one of the airfoil portions 110 toward the suction-side vane surface 119 of the adjacent airfoil portion 110, so as to extend up to the intermediate position of the flow passage width of the combustion gas flow passage 128 at the most protruding position. However, in this case, a shroud end portion 121*c* that directly faces does not exist in the circumferential direction at the side of the pressure-side vane surface 117. Thus, the intermediate position of the flow passage width of the combustion gas flow passage 128 is the position at ½ of the flow passage width of the flow passage flow passage, where the vane-surface protruding portion 180 is most protruding, and the most protruding position may include a position closer to the airfoil portion 110 than the position of ½ of the flow passage width, depending on the shape of the airfoil portion 110.

The vane-surface protruding portion 180 according to the present embodiment depicted in FIG. 18 has, similarly to the embodiment depicted in FIG. 17, the impingement plate 130 having the high-density region 136 (first high-density region 136*a*, second high-density region 136*b*) indicated by the thick dotted line so as to cover the outer edge portion 180*b* of the vane-surface protruding portion 180, so as to perform impingement cooling on the inner surface 121*b* of the shroud 120 on which the outer edge portion 180*b* of the vane-surface protruding portion 180 is formed, where the thermal stress increases, and suppress thermal stress.

Furthermore, in a case where the vane-surface protruding portion 180 is formed between adjacent airfoil portions 110, as depicted in FIG. 18, the tip end portion 180*a* of the vane-surface protruding portion 180 is disposed at a position that overlaps, in the vane height direction, with the upper impingement plate 130*a* positioned between the adjacent airfoil portions 110. Accordingly, the high-density region 136 of the through holes 114 of the impingement plate 130 in this case is positioned over both of the upper impingement plate 130*a* disposed between the adjacent airfoil portions 110, and the lower impingement plate 130*b* formed between the upper impingement plate 130*a* and the airfoil portion 110. That is, the first high-density region 136*a* is positioned at a position of the upper impingement plate 130*a* proximate to the airfoil portion 110 at the side of the leading edge 110*a*, and the second high-density region 136*b* is disposed around the leading edge portion 117*a* of the pressure-side vane surface 117 of the airfoil portion 110, of the lower impingement plate 130*b*. It should be noted that the definition of the leading edge portion 117*a* of the pressure-side vane surface 117 is as described above.

As described above, by providing the vane-surface protruding portion 180 protruding in the vane height direction, similarly to the embodiment depicted in FIG. 17, the flow velocity of the combustion gas flow FL1 flowing along the pressure-side vane surface 117 of the airfoil portion 110 increases, which has an effect to reduce the secondary flow FL2. As a result, the pressure loss of the combustion gas flow FL1 flowing through the combustion gas flow passage 128 due to generation of the secondary flow FL2 is reduced, and the aerodynamic performance of the vane improves. Furthermore, the high-density region 136 of the impingement plate 130 is disposed at the side of the inner surface 121*b* opposite to the outer surface 121*a* so as to cover the outer edge portion 180*b* of the vane-surface protruding portion 180, and thereby thermal stress is suppressed in the region of the shroud 120 where the vane-surface protruding portion 180 is formed.

FIG. 19 is a planar view of the turbine stator vane according to another embodiment, where the vane-surface protruding portion 180 is provided to suppress the secondary flow FL2 of the combustion gas flow FL1. Also in the present embodiment, similarly to the embodiment depicted in FIGS. 17 and 18, the vane-surface protruding portion 180 is formed on the outer surface 121*a* of the shroud 120, more specifically, on the pressure-side vane surface 117 at the side of the leading edge 110*a*. As depicted in FIGS. 15, 16, and 19, the vane-surface protruding portion 180 connects to the fillet 126 formed on the airfoil portion 110 via the connection portion 181, and extends from the connection portion 181 in a direction in which the combustion gas FL flows in, to the tip end portion 180*a*. The vane-surface protruding portion 180 has a mountain-like convex shape which protrudes toward the side of the combustion gas flow passage 128 in the vane height direction from the outer surface 121*a* of the shroud 120. The vane-surface protruding portion 180 is disposed so as to form an oblique surface having a high height from the outer surface 121*a* at the connection portion 181 to the fillet 126, and the height gradually decreases toward the leading edge 110*a* and the trailing edge 110*b*. Furthermore, the boundary at which the vane-surface protruding portion 180 connects to the outer surface 121*a* of the shroud 120 forms the outer edge portion 180*b* of the vane-surface protruding portion 180.

While the present embodiment describes an example where a single shroud has three vanes, the cooling structure around the vane-surface protruding portion 180 of the airfoil portion 110 where the pressure-side vane surface 117 of the airfoil portion 110 directly faces the outer wall portion 123 is the same cooling structure as that depicted in FIG. 17. Furthermore, the cooling structure around the vane-surface protruding portion 180 of the airfoil portion 110 whose pressure-side vane surface 117 directly faces the suction-side vane surface 119 of the airfoil portion 110 adjacent to the airfoil portion 110 is the same structure as in a case where the vane-surface protruding portion 180 is disposed between adjacent airfoil portions 110 as depicted in FIG. 18.

As described above, by providing the vane-surface protruding portion 180 protruding in the vane height direction, similarly to the embodiments depicted in FIGS. 17 and 18, the flow velocity of the combustion gas flow FL1 flowing along the pressure-side vane surface 117 of the airfoil portion 110 increases, which has an effect to reduce the secondary flow FL2. As a result, the pressure loss of the combustion gas flow FL1 flowing through the combustion gas flow passage 128 due to generation of the secondary flow FL2 is reduced, and the aerodynamic performance of the vane improves.

Furthermore, the high-density region 136 (first high-density region 136*a*, second high-density region 136*b*) of the impingement plate 130 is disposed at the side of the inner surface 121*b* opposite to the outer surface 121*a* so as to cover the outer edge portion 180*b* of the vane-surface protruding portion 180, and thereby thermal stress is reduced in the region of the shroud 120 where the vane-surface protruding portion 180 is formed.

FIG. 20 is an internal cross-sectional view of the turbine stator vane according to another embodiment. The structure depicted in FIG. 20 is substantially the same as the inner cross section of the airfoil portion 110 depicted in FIG. 3. Except, an air pipe 127 is disposed in the second cooling flow passage 111*b* so as to extend through the airfoil portion 110 in the vane height direction, and an end of the air pipe 127 has an opening into the internal space 116 formed in a retainer ring 162 supported by the inner shroud 122. The retainer ring 162 protrudes from the inner surface 122*b* of the inner shroud 122 inward in the vane height direction, and is supported by the inner shroud 122 via an upstream rib 161*a* disposed at the side of the leading edge 110*a* and a downstream rib 161*b* disposed at the side of the trailing edge 110*b*. Furthermore, the impingement plate 130 having a plurality of through holes 114 that partitions the internal space 116 is disposed between the upstream rib 161*a* and the downstream rib 161*b*. With the impingement plate 130 provided, the impingement space 116*a* is formed between the impingement plate 130 and the inner surface 122*b* of the inner shroud 122. Furthermore, the retainer ring 162 has a circulation hole 162*a* on the bottom surface.

The impingement plate 130 formed on the inner shroud 122 includes, although not depicted in FIG. 20, an upper impingement plate 130*a* and a lower impingement plate 130*b* having a plurality of through holes 114, similarly to some embodiments depicted in FIGS. 9 to 14 and 17 to 19. The lower impingement plate 130*b* is fixed to one of the outer wall portion 123 of the inner shroud 122 or the circumferential edge portion 135 of the airfoil portion 110, for instance, by welding or the like, and the upper impingement plate 130*a* is disposed in the intermediate region between the lower impingement plates 130*b*, similarly to the other embodiments.

The cooling air Ac supplied from the internal space 116 of the outer shroud 121 is supplied to the internal space 116 formed on the retainer ring 162 at the side of the inner shroud 122 via the air pipe 127. A part of the cooling air Ac is used as cooling air for performing impingement cooling on the inner surface 122*b* of the inner shroud 122 via the through holes 114 of the impingement plate 130, and the rest of the cooling air Ac is supplied to the inter-stage cavity (not depicted) from the circulation hole 162*a* and serves as purge air that prevents combustion gas from flowing backward into the inter-stage cavity.

Furthermore, as described above, also in the inner shroud 122, the secondary flow FL2 of the combustion gas described with reference to the embodiments depicted in FIGS. 17 to 19 may be generated. To suppress generation of the secondary flow, similarly to the other embodiments, a non-depicted vane-surface protruding portion 180 is formed on the outer surface 122*a* of the inner shroud 122. To cool the outer edge portion 180*b* of the vane-surface protruding portion 180, the high-density region 136 (first high-density region 136*a*, second high-density region 136*b*) having a higher opening density of the through holes 114 is formed, as the arrangement of the through holes 114 of the impingement plate 130, similarly to the other embodiments. The cooling air Ac discharged from the through holes 114 in the high-density region 136 having a higher opening density performs impingement cooling on the inner surface 122*b* of the inner shroud 122, and cools the inner shroud 122 around the outer edge portion 180*b* of the vane-surface protruding portion 180, thereby reducing thermal stress that occurs on the inner shroud.

Similarly to the embodiments depicted in FIGS. 9 to 14, also in the embodiments depicted in FIGS. 17 to 19, the through holes 114 (upper through holes 114*a*, lower through holes 114*b*) are disposed over the entire surfaces of the upper impingement plate 130*a* and the lower impingement plate 130*b* (only a part of the through hole 114 is depicted in FIGS. 17 to 19).

While the above example is described referring mainly to the outer shroud 121, the same structure can be applied to the inner shroud 122, and have the same advantageous effects.

Embodiments of the present invention were described in detail above, but the present invention is not limited thereto, and various amendments and modifications may be implemented.

For instance, in the embodiments depicted in FIGS. 2, 3, 5, and 6, the lid portion 150 may be formed such that the circumferential wall portion 151 and the top portion 152 are connected smoothly via a curved surface.

Furthermore, for instance, in yet another embodiment depicted in FIGS. 4 and 7, the lid portion 150 may be formed such that the circumferential wall portion 151 and the plate support portion 157 are connected smoothly via a curved surface. Similarly, for instance, in yet another embodiment depicted in FIGS. 4 and 7, the lid portion 150 may be formed such that the plate support portion 157 and the upper circumferential wall portion 153 are connected smoothly via a curved surface. For instance, in yet another embodiment depicted in FIGS. 4 and 7, the lid portion 150 may be formed such that the upper circumferential wall portion 153 and the top portion 152 are connected smoothly via a curved surface.

REFERENCE SIGNS LIST

1 Gas turbine
8 Rotor shaft
24 Turbine rotor blade
100 Turbine stator vane
101 Vane body
110 Airfoil portion
110*a* Leading edge
110*b* Trailing edge
110*c* Tip end
110*d* Root end
110*e* Outer end portion
110*f* Inner end portion
110*g* Inner wall surface
111 Cooling flow passage
112 Turn-back flow passage
113 Cooling hole
114 Through hole
114*a* Upper through hole (first through hole)
14*b* Lower through hole (second through hole)
115 Serpentine flow passage
116 Internal space
116*a* Impingement space
117 Pressure-side vane surface
117*a* Leading edge portion
119 Suction-side vane surface
120 Shroud
121 Outer shroud
121*a* Outer surface (gas path surface)
121*b* Inner surface
121*c* Shroud end portion
122 Inner shroud
122*a* Outer surface (gas path surface)
122*b* Inner surface
123 Outer wall portion
123*a* Inner peripheral surface
124 Bottom portion
125 Trailing edge end portion
126 Fillet
127 Air pipe
128 Combustion gas flow passage
130 Impingement plate
130*a* Upper impingement plate (first impingement plate)
130*b* Lower impingement plate (second impingement plate)
130 Step portion
131*a* Oblique portion
133 Opening
135 Circumferential edge portion
136 High-density region
136*a* First high-density region
136*b* Second high-density region
137 General region
140 Partition wall
150 Lid portion
151 Circumferential wall portion (first portion)
152 Top portion (second portion)
153 Upper circumferential wall portion (third portion)
155 Protruding portion
157 Plate support portion
161*a* Upstream rib
161*b* Downstream rib
162 Retainer ring
162*a* Circulation hole
171, 173 Welding portion
180 Vane-surface protruding portion
180*a* Tip end portion
180*b* Outer edge portion
181 Connection portion
W1 Suction-pressure direction lid width
w1 Suction-pressure direction flow passage width
W2 Camber-line direction lid width
w2 Camber-line direction flow passage width
L1, L2 Gap
FL1 Combustion gas flow
FL2 Secondary flow

The invention claimed is:

1. A turbine stator vane, comprising:

a vane body which includes:

an airfoil portion which has a serpentine flow passage inside thereof, the serpentine flow passage including a plurality of cooling flow passages and a plurality of turn-back flow passages, at least one of the turn-back flow passages being disposed at an outer side or an inner side, in a vane height direction, of a gas path surface which defines a combustion gas flow passage; and a shroud disposed on at least one of a tip end side or a root end side, in the vane height direction, of the airfoil portion; and a lid portion fixed to an end portion at the tip end side or the root end side, in the vane height direction, of the airfoil portion, the lid portion forming the at least one turn-back flow passage and being provided as a separate member from the airfoil portion, wherein the shroud includes:

a bottom portion forming, in the vane height direction, an inner surface opposite to the gas path surface in the vane height direction;

an outer wall portion formed on opposite ends, in an axial direction and the circumferential direction, of the bottom portion, the outer wall portion extending in the vane height direction; and an impingement plate disposed in an internal space surrounded by the outer wall portion and the bottom portion, the impingement plate having a plurality of through holes, wherein the impingement plate includes:

a second impingement plate close to the inner surface in the vane height direction; and a first impingement plate positioned in a direction separating from the inner surface, in the vane height direction, with respect to the second impingement plate, wherein at least one step portion extending in the axial direction or the circumferential direction is disposed between the outer wall portion and the lid portion, the step portion connecting the first impingement plate and the second impingement plate and being bent in the vane height direction, wherein a hole diameter of first through holes being the through holes formed on the first impingement plate is greater than a hole diameter of second through holes being the through holes formed on the second impingement plate, wherein an arrangement pitch of the first through holes formed on the first impingement plate is greater than the arrangement pitch of the second through holes formed on the second impingement plate, and wherein the second impingement plate comprises two second impingement plates fixed to an inner surface of the outer wall portion of the shroud and to an outer wall surface of the lid portion respectively, and the first impingement plate is positioned between the two second impingement plates via the step portion.

2. The turbine stator vane according to claim 1, wherein the airfoil portion includes a pressure-side vane surface recessed to have a concave shape in a circumferential direction, and a suction-side vane surface protruding to have a convex shape in the circumferential direction and connecting to the pressure-side vane surface via a leading edge and a trailing edge, and a vane-surface protruding portion formed on the gas path surface, extending from a leading edge portion of the pressure-side vane surface toward the suction-side vane surface of the airfoil portion of the turbine stator vane which is positioned adjacent in the circumferential direction, to an intermediate position of a flow passage width of the combustion gas flow passage between the airfoil portion and the adjacent airfoil portion, the vane-surface protruding portion being surrounded by an outer edge portion formed at a position connecting to the gas path surface and protruding from the gas path surface toward the side of the combustion gas flow passage in the vane height direction.

3. The turbine stator vane according to claim 2, wherein the first and second impingement plates both include:

a general region positioned so as to face the inner surface of the shroud being a region where the vane-surface protruding portion is not formed, the general region having the plurality of through holes configured to perform impingement cooling on the inner surface; and a high-density region including a range in which the vane-surface protruding portion is formed and which is surrounded by the outer edge portion, the high-density region having a higher opening density of the through holes than that in the general region.

4. The turbine stator vane according to claim 2, wherein the impingement plate has an opening to be engaged with the lid portion, and wherein the lid portion includes a protruding portion protruding opposite to the airfoil portion from the opening in the vane height direction.

5. The turbine stator vane according to claim 1, wherein the shroud includes an outer shroud or an inner shroud formed on the tip end side or the root end side of the airfoil portion.

6. A gas turbine, comprising:

the turbine stationary vane according to claim 1;

a rotor shaft; and a turbine rotor blade disposed on the rotor shaft.

7. A turbine stator vane, comprising:

a vane body which includes:

an airfoil portion which has a serpentine flow passage inside thereof, the serpentine flow passage including a plurality of cooling flow passages and a plurality of turn-back flow passages, at least one of the turn-back flow passages being disposed at an outer side or an inner side, in a vane height direction, of a gas path surface which defines a combustion gas flow passage; and a shroud disposed on at least one of a tip end side or a root end side, in the vane height direction, of the airfoil portion; and a lid portion fixed to an end portion at the tip end side or the root end side, in the vane height direction, of the airfoil portion, the lid portion forming the at least one turn-back flow passage and being provided as a separate member from the airfoil portion, wherein the airfoil portion includes a pressure-side vane surface recessed to have a concave shape in a circumferential direction, and a suction-side vane surface protruding to have a convex shape in the circumferential direction and connecting to the pressure-side vane surface via a leading edge and a trailing edge, wherein the shroud includes:

a bottom portion forming, in the vane height direction, an inner surface opposite to the gas path surface in the vane height direction;

an outer wall portion formed on opposite ends, in an axial direction and the circumferential direction, of the bottom portion, the outer wall portion extending in the vane height direction;

an impingement plate disposed in an internal space surrounded by the outer wall portion and the bottom portion, the impingement plate including a plurality of through holes; and a vane-surface protruding portion formed on the gas path surface, extending from a leading edge portion of the pressure-side vane surface toward the suction-side vane surface of the airfoil portion of the turbine stator vane which is positioned adjacent in the circumferential direction, to an intermediate position of a flow passage width of the combustion gas flow passage between the airfoil portion and the adjacent airfoil portion, the vane-surface protruding portion being surrounded by an outer edge portion formed at a position connecting to the gas path surface and protruding from the gas path surface toward the side of the combustion gas flow passage in the vane height direction, wherein the impingement plate includes:

a general region positioned so as to face the inner surface of the shroud being a region where the vane-surface protruding portion is not formed, the general region having the plurality of through holes configured to perform impingement cooling on the inner surface; and a high-density region including a range in which the vane-surface protruding portion is formed and which is surrounded by the outer edge portion, the high-density region having a higher opening density of the through holes than that in the general region, wherein the impingement plate includes:

a second impingement plate close to the inner surface in the vane height direction; and a first impingement plate positioned in a direction separating from the inner surface, in the vane height direction, with respect to the second impingement plate, wherein the second impingement plate and the first impingement plate are connected via a step portion bent in the vane height direction, wherein at least one of the step portion extending in the axial direction or the circumferential direction is disposed between the outer wall portion and the lid portion, wherein the first impingement plate includes a first high-density region where the opening density is higher than that in the general region of the first impingement plate, and wherein the second impingement plate includes a second high-density region where the opening density is higher than that in the general region of the second impingement plate.

8. The turbine stator vane according to claim 7,
wherein the shroud has a plurality of the airfoil portions arranged in the circumferential direction, and
wherein the step portion is disposed between a plurality of the lid portions each of which is disposed on corresponding one of the airfoil portions, the step portion extending in the axial direction or the circumferential direction.

9. The turbine stator vane according to claim 8,
wherein a hole diameter of first through holes being the through holes formed on the first impingement plate is greater than a hole diameter of second through holes being the through holes formed on the second impingement plate.

10. The turbine stator vane according to claim 9,
wherein an arrangement pitch of the first through holes formed on the first impingement plate is greater than an arrangement pitch of the second through holes formed on the second impingement plate.

11. The turbine stator vane according to claim 7,
wherein a hole diameter of first through holes being the through holes formed on the first impingement plate is greater than a hole diameter of second through holes being the through holes formed on the second impingement plate.

12. The turbine stator vane according to claim 11,
wherein an arrangement pitch of the first through holes formed on the first impingement plate is greater than an arrangement pitch of the second through holes formed on the second impingement plate.

13. The turbine stator vane according to claim 7,
wherein the second impingement plate comprises two second impingement plates fixed to an inner surface of the outer wall portion of the shroud and to an outer wall surface of the lid portion respectively, and the first impingement plate is positioned between the two second impingement plates via the step portion.

14. The turbine stator vane according to claim 7,
wherein the step portion has an oblique surface which is oblique with respect to the vane height direction.

15. A gas turbine, comprising:
the turbine stationary vane according to claim 7;
a rotor shaft; and
a turbine rotor blade disposed on the rotor shaft.

* * * * *